(12) United States Patent
Slayton et al.

(10) Patent No.: US 8,770,977 B2
(45) Date of Patent: Jul. 8, 2014

(54) INSTRUCTOR-LEAD TRAINING ENVIRONMENT AND INTERFACES THEREWITH

(75) Inventors: David A. Slayton, Burke, VA (US); Charles W. Lutz, Jr., Orlando, FL (US); Delbert Cope, Orlando, FL (US); Dale E. Newcomb, Jr., Leesburg, VA (US); Robert J. Kobes, Thornburg, VA (US); Robert E. Young, Waynesboro, PA (US); Eric A. Preisz, Fairfax, VA (US); Christopher M. Ledwith, Fairfax, VA (US); Syrus Mesdaghi, Centreville, VA (US); Carl Douglas Walker, Front Royal, VA (US)

(73) Assignee: Dynamic Animation Systems, Inc., Fairfax, VA (US)

(*) Notice: Subject to any disclaimer, the term of this patent is extended or adjusted under 35 U.S.C. 154(b) by 1618 days.

(21) Appl. No.: 11/285,390

(22) Filed: Nov. 23, 2005

(65) Prior Publication Data
US 2008/0108021 A1 May 8, 2008

Related U.S. Application Data

(60) Provisional application No. 60/630,304, filed on Nov. 24, 2004, provisional application No. 60/734,276, filed on Nov. 8, 2005.

(51) Int. Cl.
*F41A 33/00* (2006.01)
*G09B 19/00* (2006.01)

(52) U.S. Cl.
USPC .............................. 434/16; 434/21

(58) Field of Classification Search
USPC ................................. 434/16, 21–22
See application file for complete search history.

(56) References Cited

U.S. PATENT DOCUMENTS

| | | | | |
|---|---|---|---|---|
| 4,336,018 A * | 6/1982 | Marshall et al. | ............. | 434/22 |
| 6,287,198 B1 * | 9/2001 | McCauley | ............. | 463/37 |
| 6,296,486 B1 * | 10/2001 | Cardaillac et al. | ............. | 434/12 |
| 6,575,753 B2 | 6/2003 | Rosa et al. | | |
| 6,672,962 B1 * | 1/2004 | Ozaki et al. | ............. | 463/37 |
| 6,902,483 B2 * | 6/2005 | Lin | ............. | 463/37 |
| 6,999,083 B2 | 2/2006 | Wong et al. | ............. | 345/473 |
| 7,291,014 B2 * | 11/2007 | Chung et al. | ............. | 434/11 |
| 2002/0012898 A1 * | 1/2002 | Shechter et al. | ............. | 434/21 |
| 2009/0099824 A1 * | 4/2009 | Falash et al. | ............. | 703/8 |

OTHER PUBLICATIONS

International Search Report for PCT Application No. PCT/US2005/42659, which claims priority to U.S. Appl. No. 60/630,304 and U.S. Appl. No. 60/734,276.

* cited by examiner

*Primary Examiner* — Kathleen Mosser
(74) *Attorney, Agent, or Firm* — Paul F. McQuade; Greenberg Traurig, LLP

(57) ABSTRACT

An infantry training simulation system comprising at least one firing lane, with at least one display arranged substantially near the end of the firing lane. A trainee experiencing the simulation can carry at least one physical or virtual weapon, which is typically similar to a traditional infantry weapon. To facilitate navigation and other interaction with the simulation, the weapon is preferably outfitted with at least one controller. At least one computer is communicatively coupled to the display and the weapon. The computer can monitor input from the at least one controller, and modifies the training simulation displayed on the display based on the input.

46 Claims, 25 Drawing Sheets

INSTRUCTOR-LEAD TRAINING ENVIRONMENT AND INTERFACES THEREWITH

This application relates to and claims priority from Provisional U.S. Patent Application Ser. No. 60/630,304 filed Nov. 24, 2004, and from Provisional U.S. Patent Application Ser. No. 60/734,276, filed Nov. 8, 2005, which are hereby incorporated by reference in their entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to the field of instructor-based simulated training environments, and more specifically provides new interfaces to such environments.

BACKGROUND OF THE INVENTION

Armed forces throughout the world rely on well trained men and women to protect their countries from harm. Such training varies widely among the different military branches, but until recently, such training has essentially involved one of two extremes, either highly advanced simulations, or hands-on, real-world training.

This training divide exists for several reasons. One such reason is that the cost of developing simulated training environments is typically significantly higher than the real-world training. For example, according to statistics compiled in 2001, it costs the United States Army approximately $35,000 to train a new infantry recruit using traditional training methods. When this is compared to the cost of developing and deploying an infantry simulator, which could easily cost tens of millions of dollars, it is typically seen as more cost effective to provide traditional, hands-on training. The exception to this is in the aviation and maritime realms, where each real-world aircraft or watercraft can easily cost tens of millions of dollars, and training a pilot can cost hundreds of thousands of dollars. In such instances, developing simulators that allowed entry-level pilots to gain experience without entering the cockpit or bridge of a real aircraft or watercraft has proven to be a much more cost-effective training approach than risking the lives and safety of valuable instructors, trainees, and equipment.

Another reason for the training divide is that most infantry-related tasks require maneuvering. Unlike pilots, who sit in a relatively static, fixed-dimension cockpit or bridge, infantry and other service members are required to move around a much broader area. For example, an infantry training exercise may involve securing a building in a city. Where the simulation begins at the outskirts of the city, the recruit must be able to navigate the city and find the appropriate building, enter it, and secure it. Such interactions have heretofore required awkward interfaces that tended to be distracting, and have not allowed the recruits to be fully immersed in the simulation. Thus, traditional, hands-on training has traditionally been preferred for infantry recruits.

While traditional, hands-on, real-world training has traditionally been preferred for training infantry recruits, such training has its disadvantages. For example, it is often difficult to simulate the various environmental, structural, and linguistic differences experienced in different theaters. By contrast, a simulated training environment can readily allow a recruit to experience these differences.

SUMMARY OF THE INVENTION

What is needed is a system and methods through which infantry and other recruits can be trained using simulated environments that overcomes one or more of the limitations of the prior art.

It is an object of the present invention to provide a lane-based, instructor controllable, simulated training environment.

It is another object of the present invention to provide a user interface device through which an infantry recruit or other such trainee can easily navigate large simulated geographies.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

Technologies have been developed to support the needs of defense and civilian security forces. Specific training areas addressed by this technology can include, but are not limited to, small arms non-live fire marksmanship training, situation-based deadly force application decision-making skills, driver training, and convoy protection skills training. Although the exemplary embodiments described below address the software and hardware technologies as they exist today in the context of demonstration applications for military and law-enforcement training systems, it should be apparent to one skilled in the art that such systems can be readily adapted for alternative use contexts, such as, without limitation, video games, civilian weapons training, paramilitary training, and the like. The technology building blocks explained in the exemplary embodiments can be enhanced, combined, and configured in various ways as a solution to a diverse set of training needs.

The system is preferably scalable, and allows multiple lanes to simultaneously interoperate with the simulation, thereby allowing multiple team members to practice tactics, techniques, and procedures both individually and as a team. Such a configuration also allows multiple teams to train together simultaneously, allows training force on force; permits fire team on fire team or multiple fire team vs. multiple fire team training, and any combination of fire teams vs. fire teams training. Using the integrated simulation controls, a single lane fire team or squad leader can command other trainees during the exercise or practice, such as by interactive GUI or voice command.

One embodiment of the invention includes an infantry training simulation system comprising at least one firing lane, with at least one display arranged substantially near the end of the firing lane. The trainee using the simulation can carry at least one weapon, which is typically similar to an infantry weapon. To facilitate navigation and other interaction with the simulation, the weapon is preferably outfitted with at least one controller. At least one computer is communicatively coupled to the display and the weapon, monitors input from the at least one controller, and modifies the training simulation displayed on the display based on the input.

Another embodiment of the invention includes an infantry training simulation system comprising a plurality of firing lanes, wherein each firing lane has associated therewith at least one display. At least one computer is communicatively coupled to at least one of the plurality of displays and generates a training simulation for display by the at least one display to which it is attached. The embodiment preferably further includes at least one instructor station, wherein the instructor station is communicatively coupled to the at least one computer allows an instructor to take control of at least one entity in the simulation. The trainee and/or instructor can interact with the simulation through a variety of means, including through at least one weapon. Each weapon is preferably associated with a firing lane, and each of the weapons is preferably communicatively coupled to the at least one computer such that the at least one computer can monitor the trainee and/or instructor as he interacts with the weapon.

Still another embodiment of the invention includes a method of interacting with a simulated infantry scenario, comprising equipping a physical weapon with at least one controller; navigating the simulation with the at least one controller; monitoring the simulation for at least one hostile target; and engaging the hostile target using the physical weapon.

It is to be understood that both the foregoing general description and the following detailed description are exemplary and explanatory and are intended to provide further explanation of the invention as claimed.

DETAILED DESCRIPTION OF A PREFERRED EMBODIMENT

Reference will now be made in detail to preferred embodiments of the present invention, examples of which are illustrated in the accompanying drawings.

Figure 12:
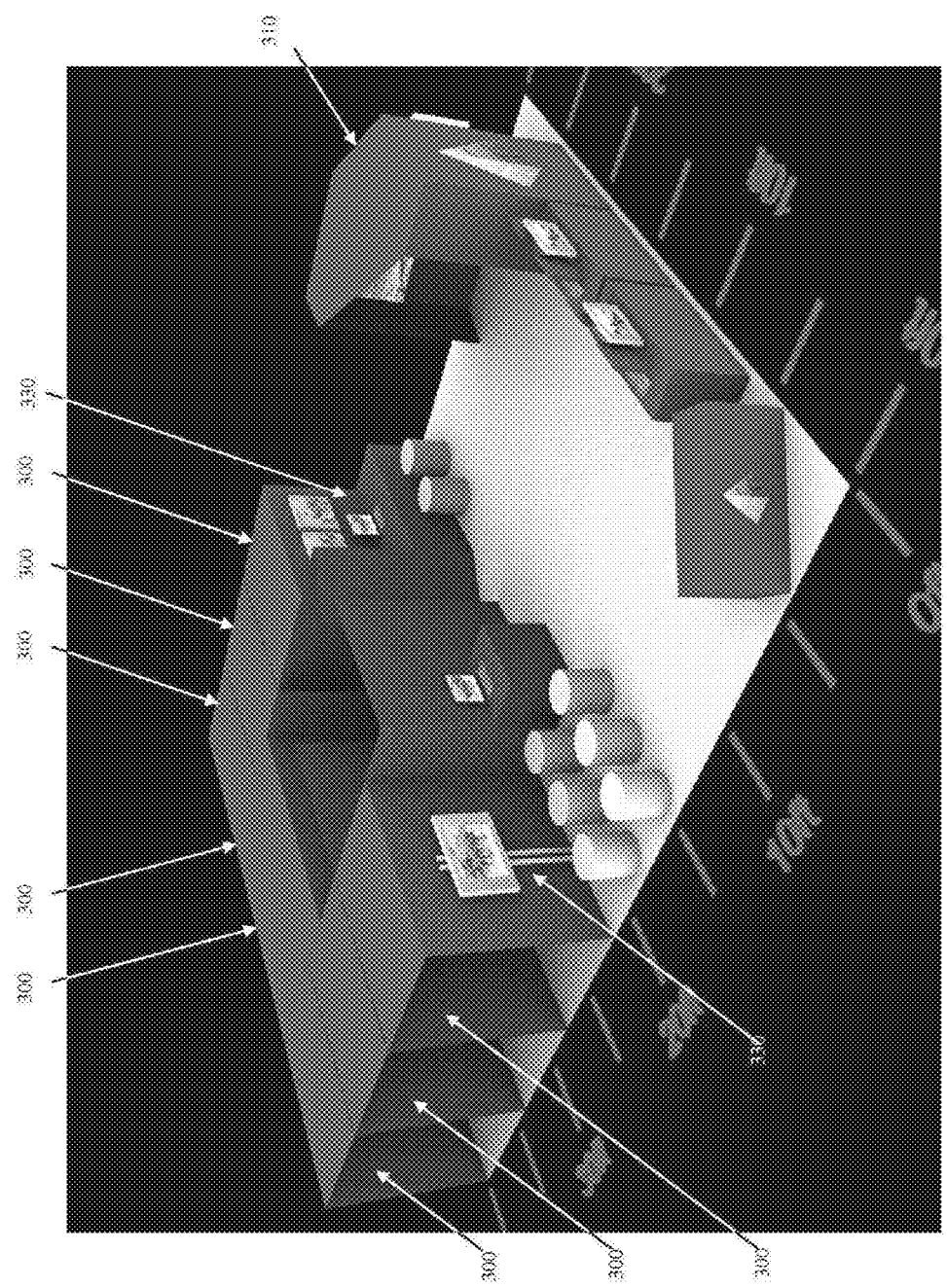
FIG. 12 is a perspective view of a training center embodiment.
Figure 13:
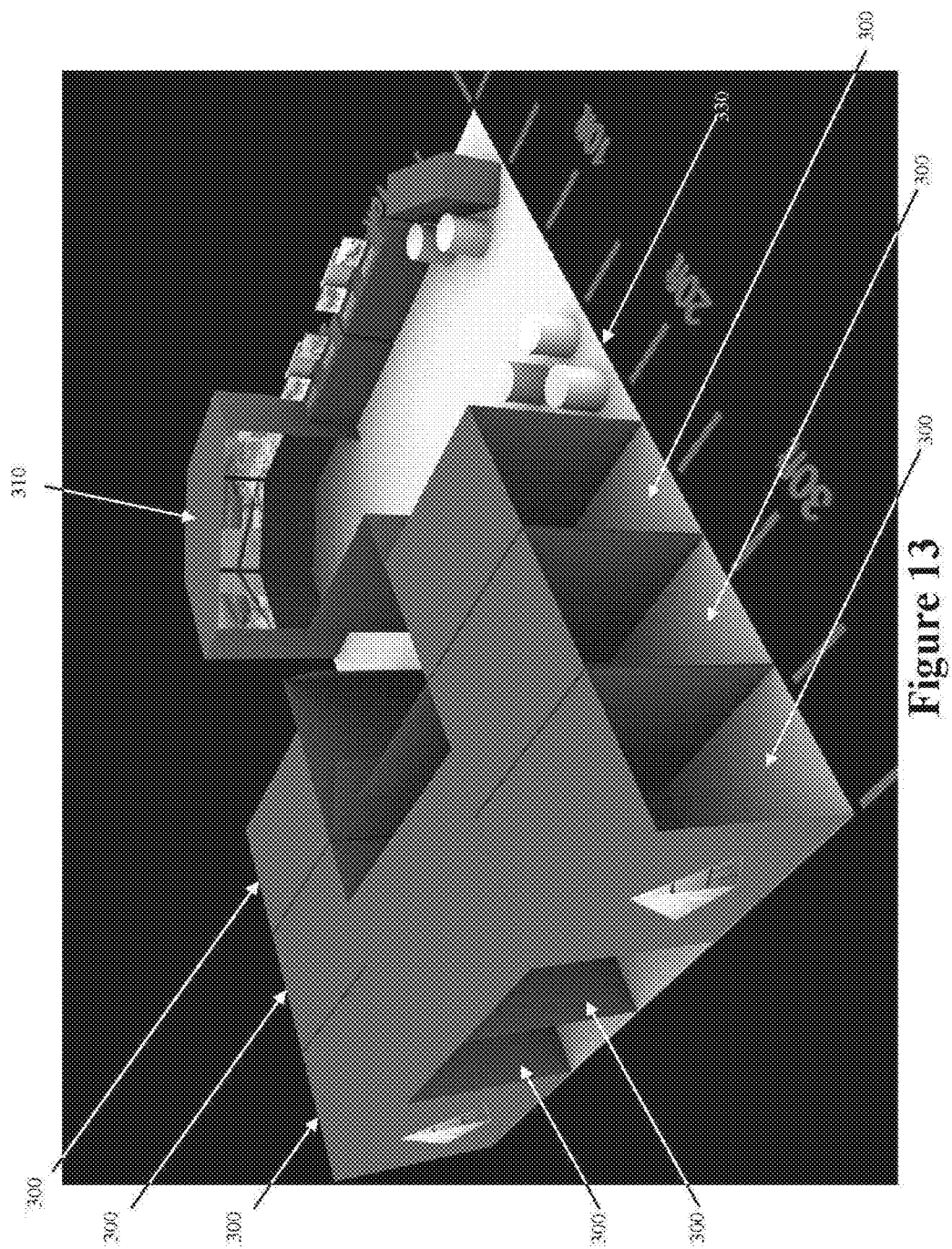
FIG. 13 is an alternative perspective view of a training center embodiment.
Figure 14:
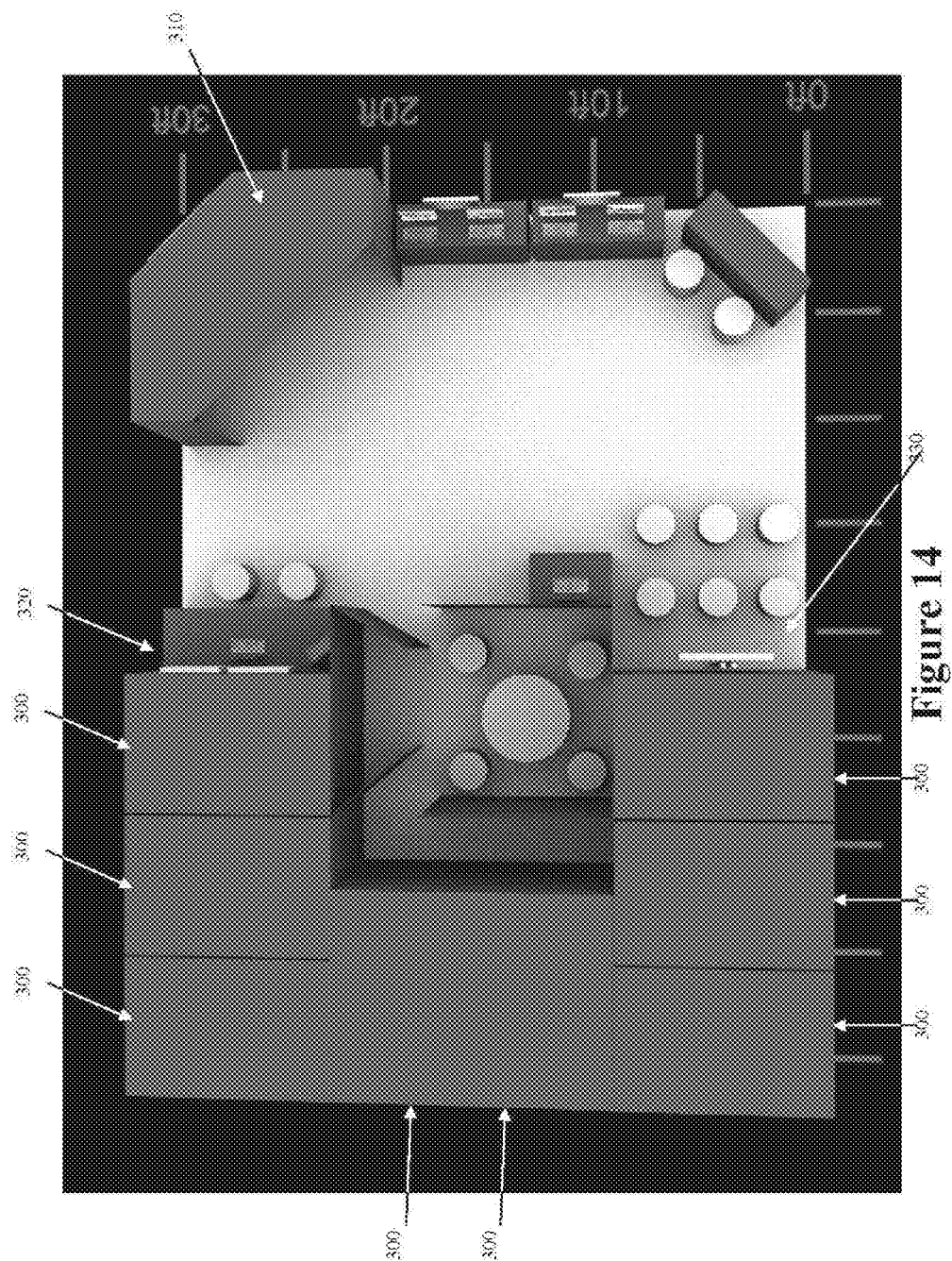
FIG. 14 is a top view of a training center embodiment.

An aspect of the present invention provides a lane-based, instructor-led, infantry training simulator. In the embodiments illustrated in FIGS. 12-14, each trainee system 300 and 310 is designed to provide a single "channel" of visual simulation and can support a single firing lane. The image generated by a single visual channel in standard 4:3 aspect ratio provides a field of view (FOV) in the virtual environment of approximately 45 degrees horizontal by 34 degrees vertical. Multiple channels can be combined in a side-by-side fashion, as in trainee system 310, to create a larger composite FOV such as 120 degrees horizontal by 34 degrees vertical. Each system can also be configured with a rotated aspect ratio of 4:3 if a larger vertical FOV is desired, and other aspect ratios may be used.

At its most basic, an embodiment of the present invention can be implemented using a computer system, a simulated or modified weapon, and a training lane. All elements of the current embodiment of the system software execute on Windows-based PC's, although it should be apparent to one skilled in the art that alternative operating systems may be substituted therefor without departing from the spirit or the scope of the invention. Each of the software components is easily configured and controlled using standard input devices such as a keyboard and mouse. Additional input devices such as, without limitation, gamepads, joysticks, steering-wheels, foot pedals, foot pads, light gloves, any Microsoft DirectInput compatible USB device, or the like can also be used with the software components as desired. While DirectInput is a preferred API for interfacing with such devices, it should be apparent to one skilled in the art that alternative interface means may be substituted therefor without departing from the spirit or the scope of the invention.

Figure 1:
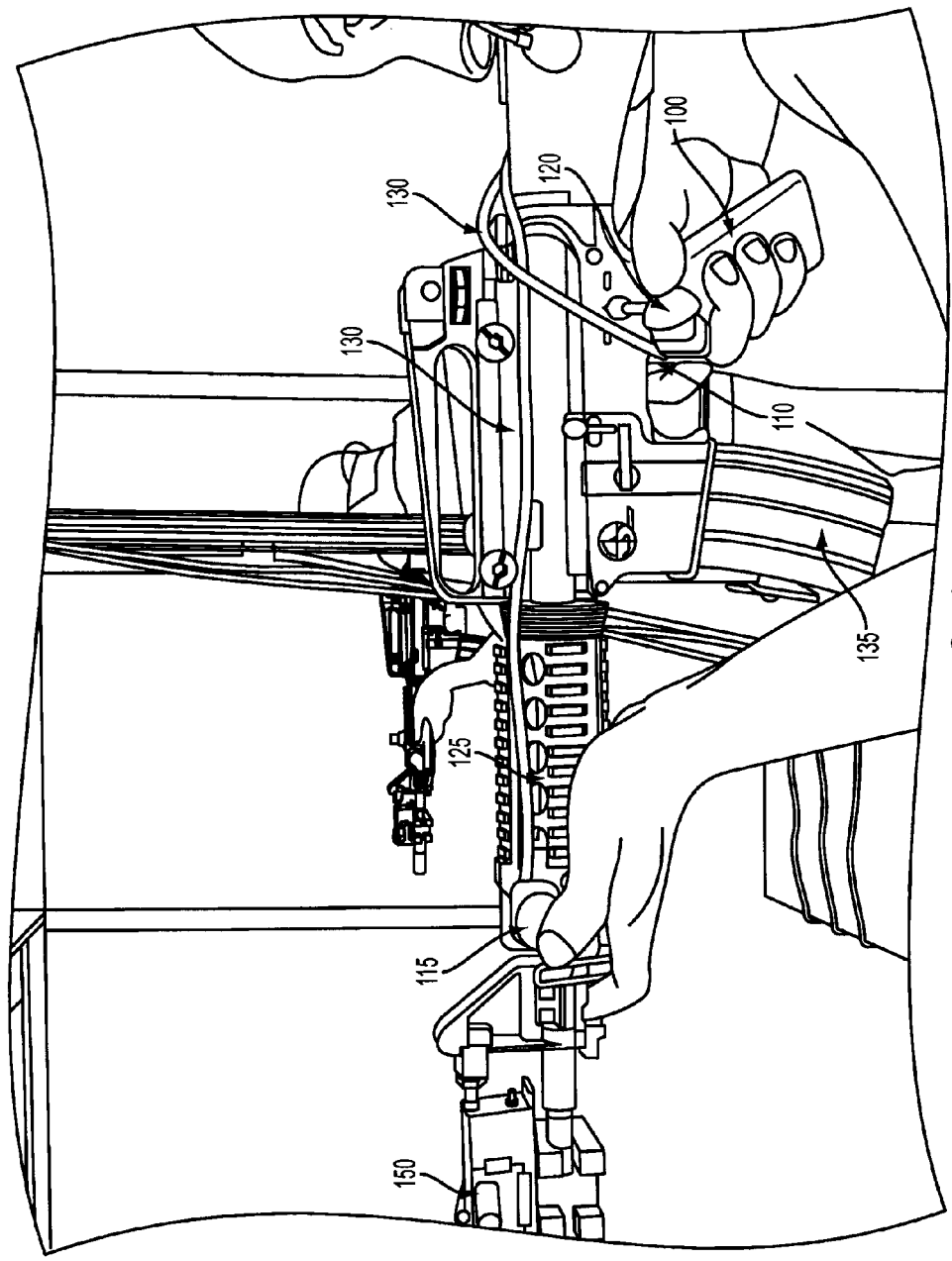
FIG. 1 is a left-hand elevation view of a weapon equipped with two controllers.
Figure 2:
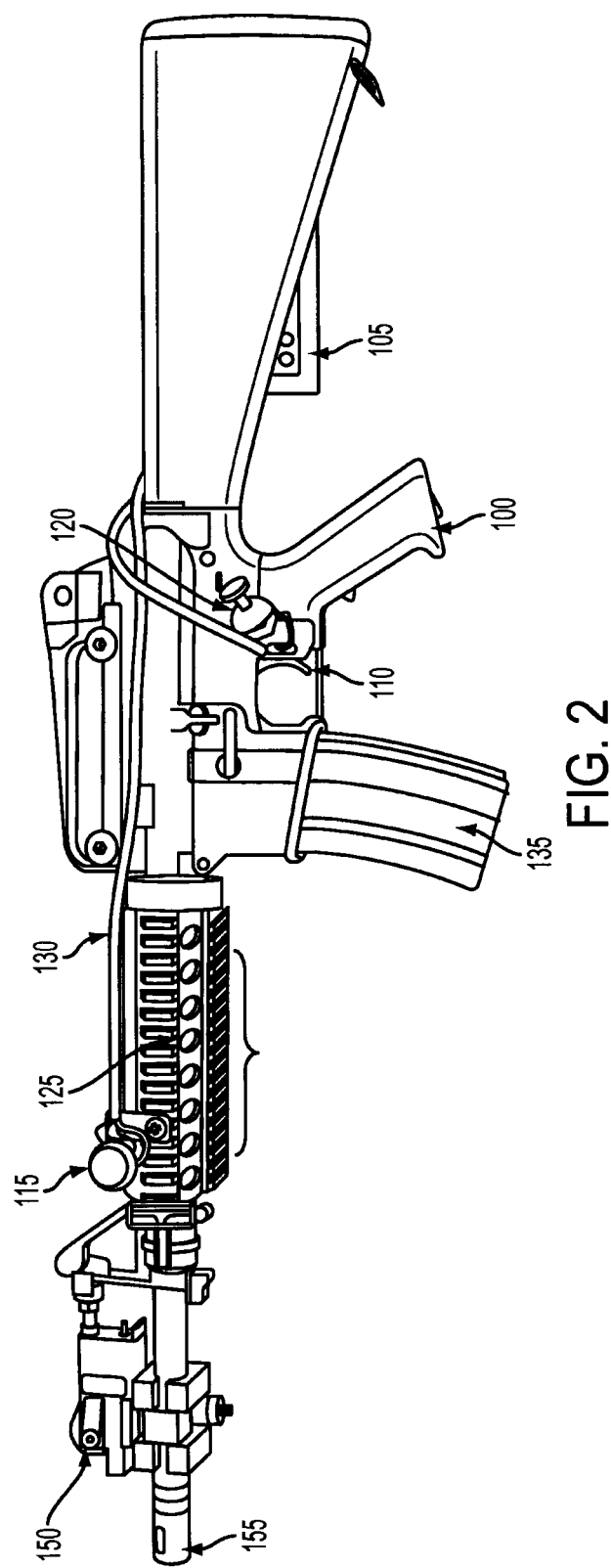
FIG. 2 is a left-hand elevation view of a weapon equipped with two controllers.
Figure 3:
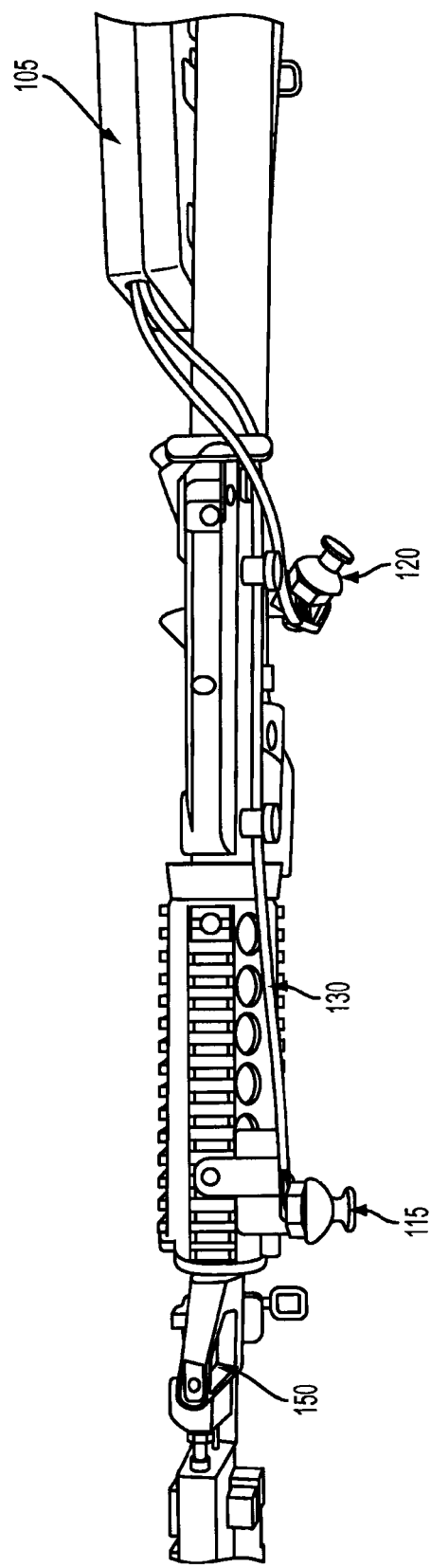
FIG. 3 is a top plan view of a weapon equipped with two controllers.
Figure 4:
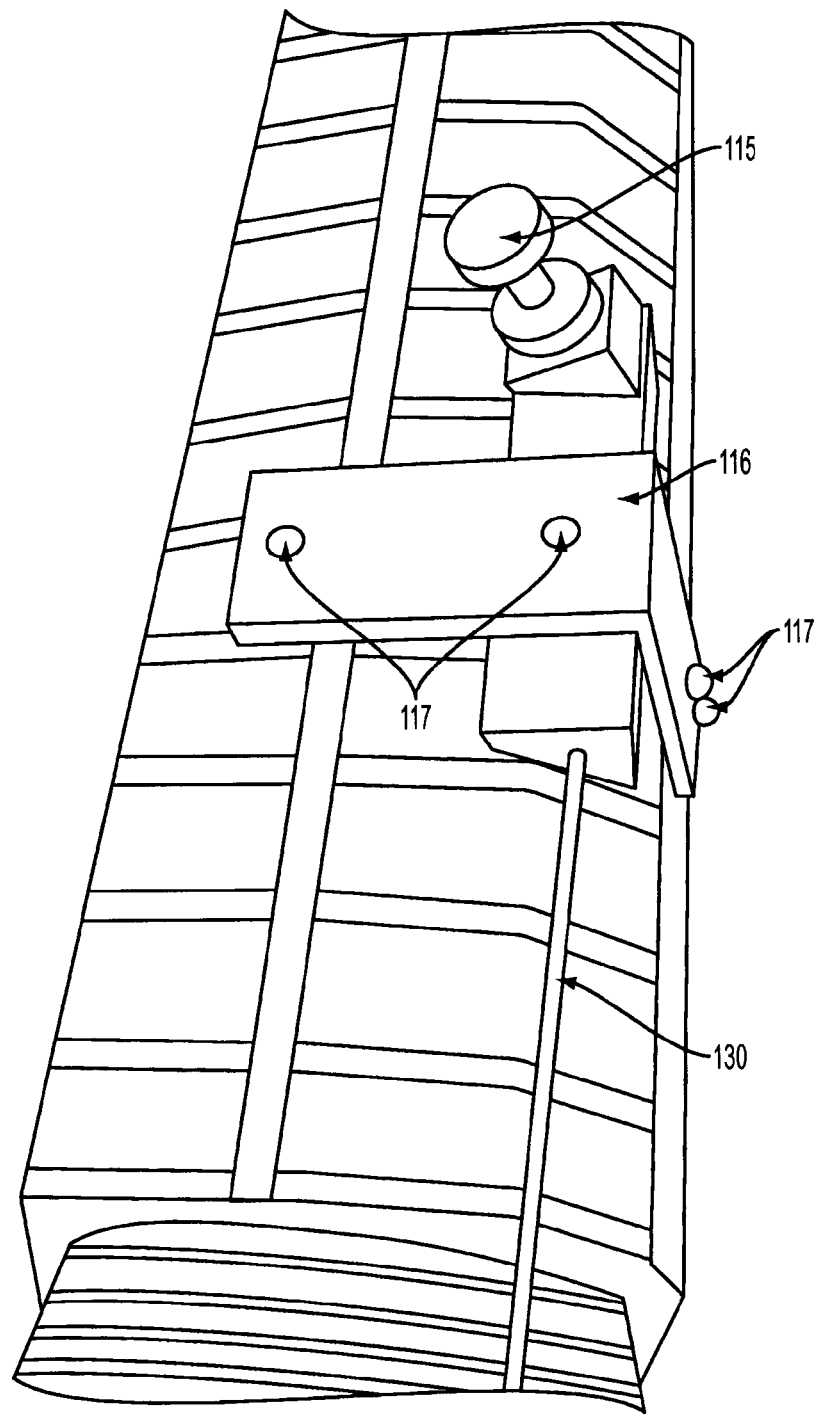
FIG. 4 is a profile view of a controller mounting means for use on the barrel of a weapon.
Figure 5:
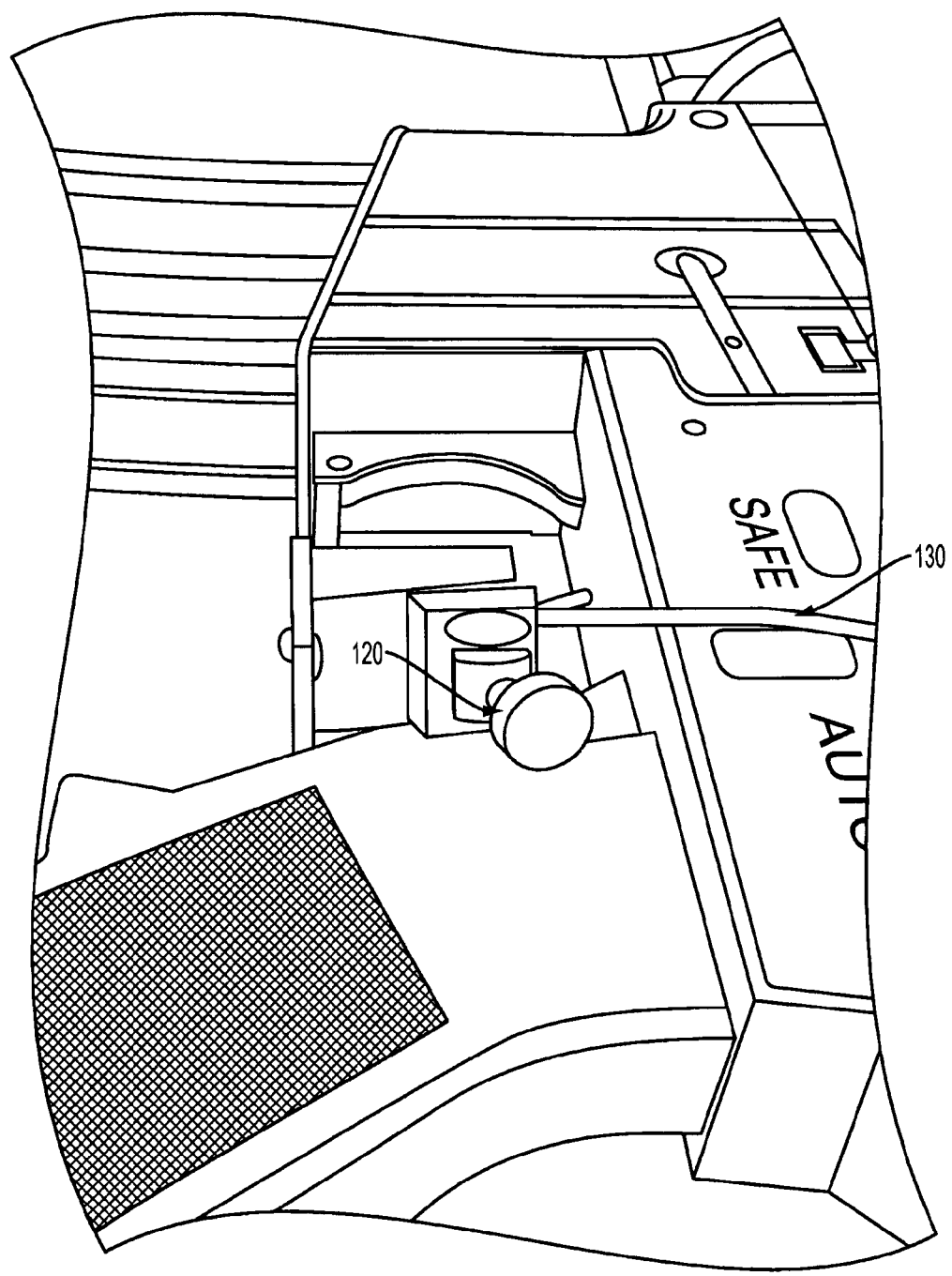
FIG. 5 is a profile view of a controller mounting means for use near the trigger of a weapon.
Figure 6:
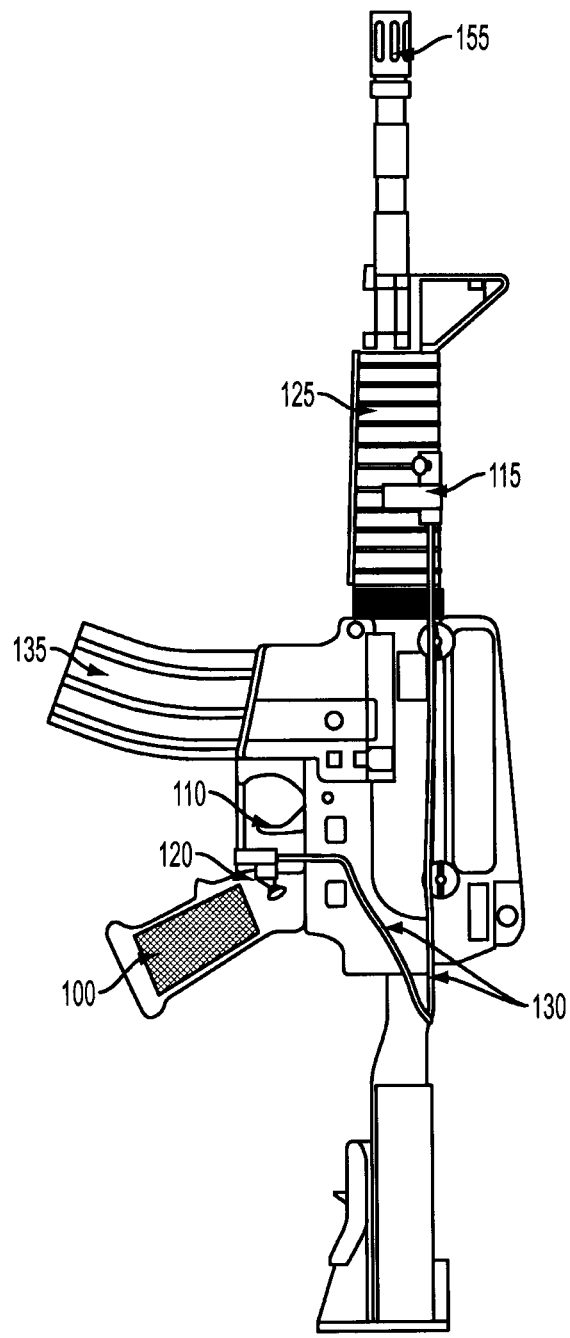
FIG. 6 is a left-hand plan view of a weapon equipped with two controllers.
Figure 7:
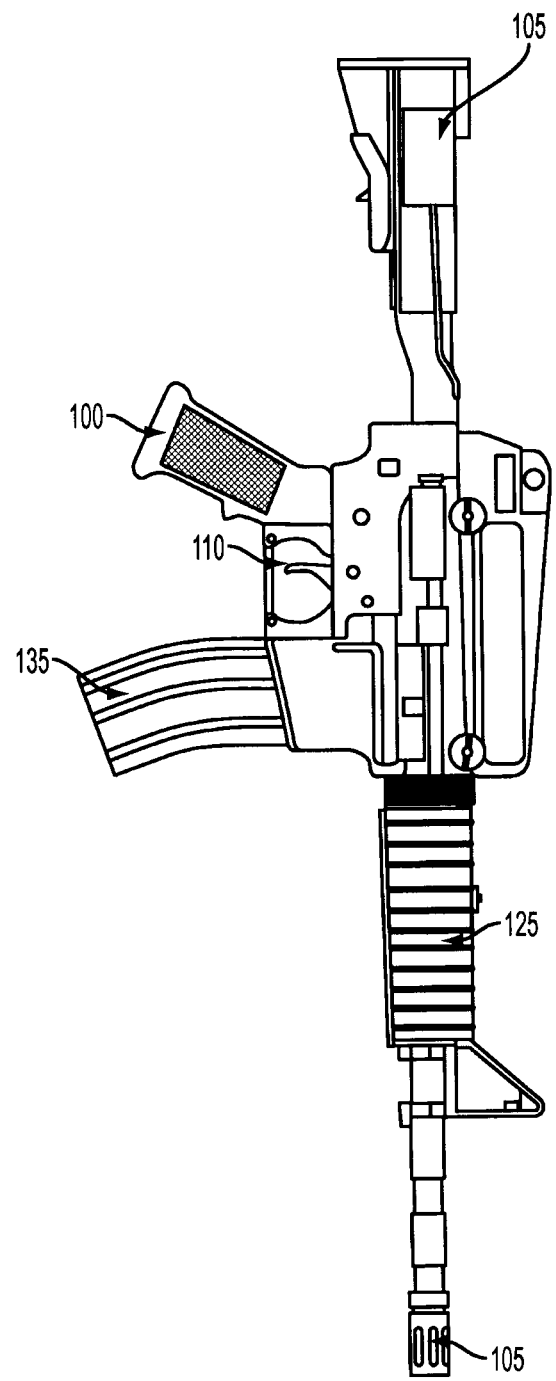
FIG. 7 is a right-hand plan view of a weapon equipped with a wireless transmitter.
Figure 8:
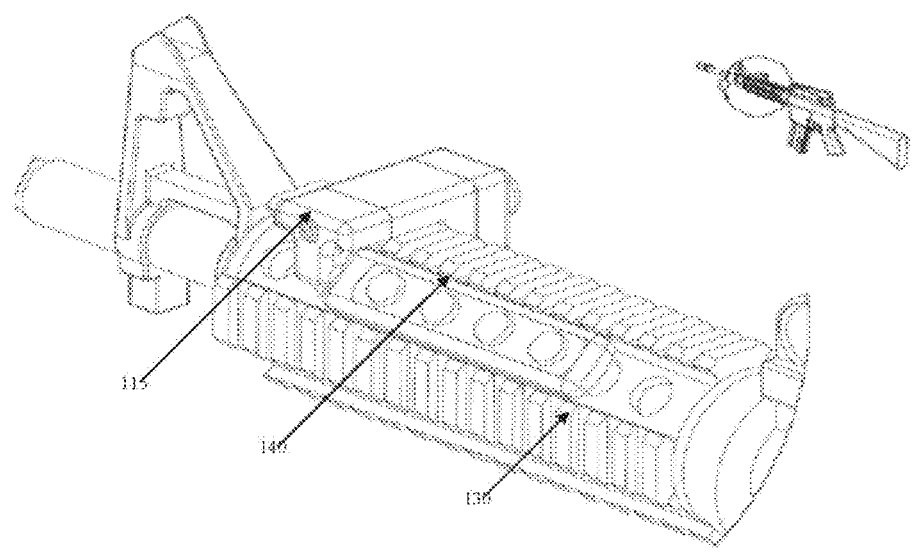
FIG. 8 is a detailed perspective view of an alternative controller and mounting means.
Figure 9:
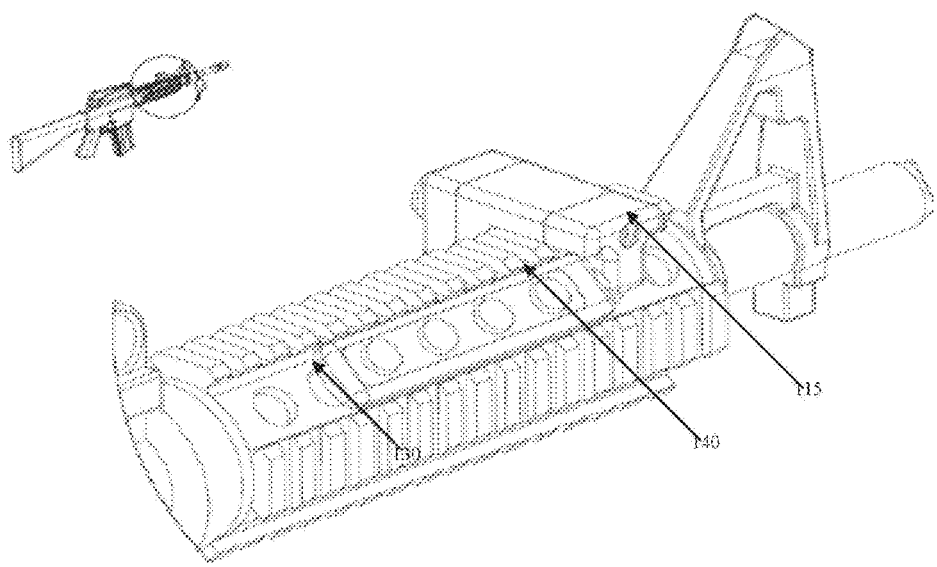
FIG. 9 is a detailed perspective view of an alternative controller and mounting means.
Figure 10:
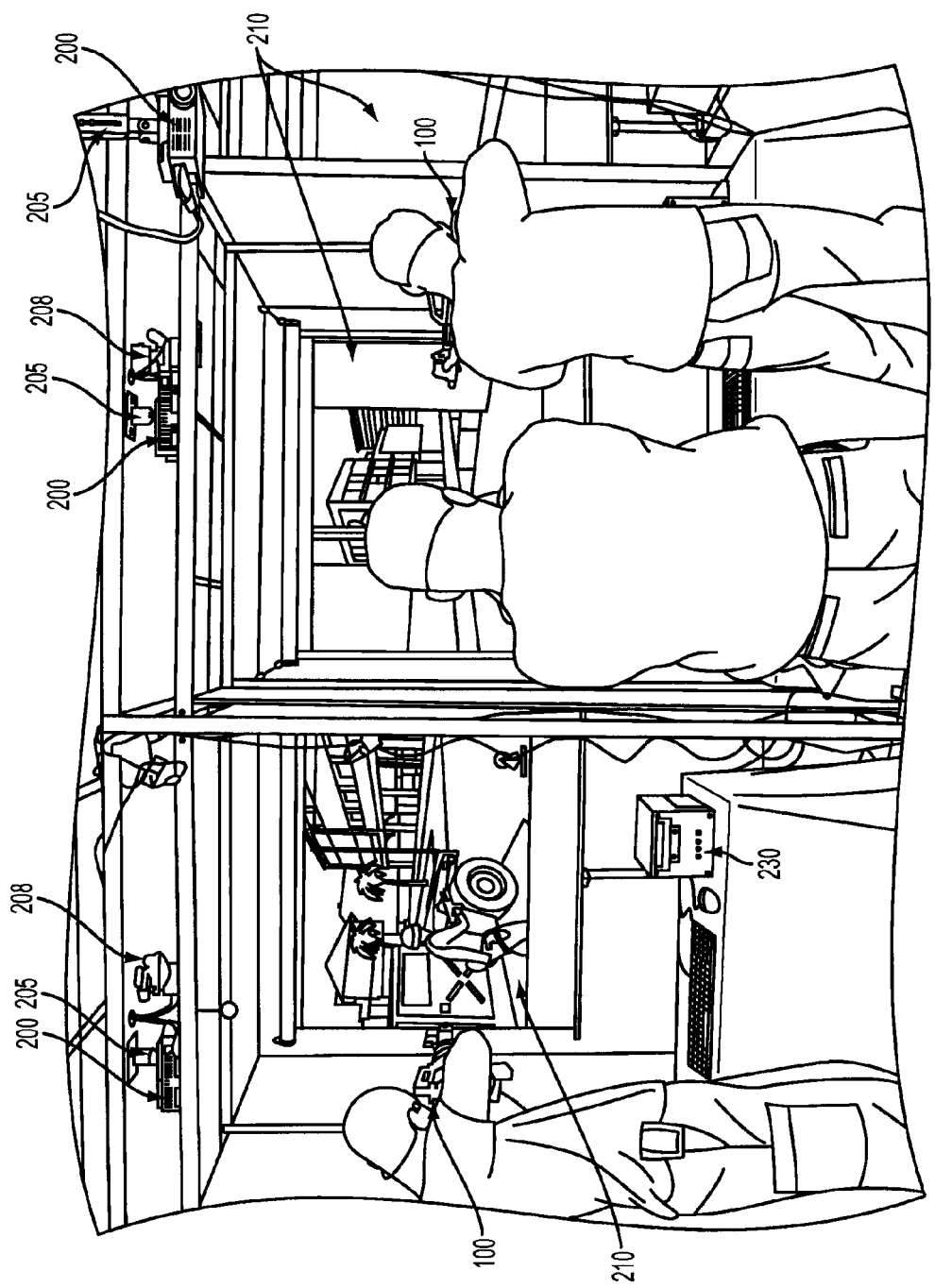
FIG. 10 is a perspective view of a plurality of training lanes in use as part of a simulation.
Figure 11:
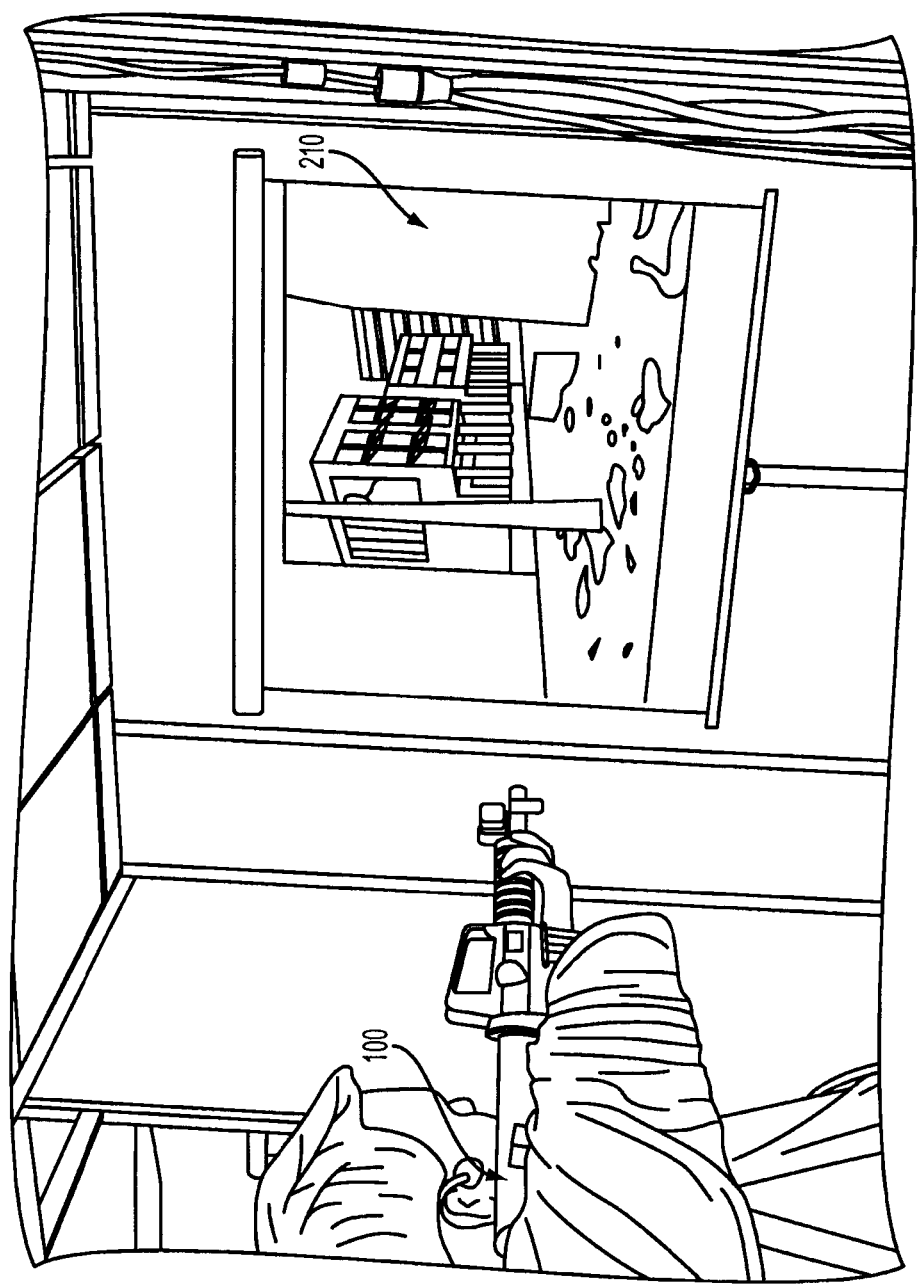
FIG. 11 is a perspective view of a single training lane.

The PC's are preferably standard COTS gaming-level performance PC's, although as technology progresses such high-end machines may not be necessary. A typical, presently preferred computer configuration is as follows:

Pentium-4 2.5 GHz or better
1 GB RAM
ATI Radeon 9800 XT 128 MB video card or better
40 GB Hard drive The software running on these PC's is preferably capable of operating in a stand-alone mode or a collaborative, networked mode. In one stand-alone mode, the trainee is the only user-controlled entity in the environment with all other entities controlled by AI per the scenario definition. In collaborative, networked mode, each instantiation of the application software, such as, without limitation, each separately controlled trainee PC on the network, represents a trainee-controlled entity. The trainee-controlled entity can be friendly or hostile, with his role and beginning position set by the scenario. With this capability, the following engagement scenarios can be trained:

Single vs. Programmable AI
Team vs. Programmable AI
Single vs. Single
Team vs. Team As illustrated in FIGS. 10 and 11, a preferred trainee system may consist of at least one display system 200, such as a high-lumen compact projector affixed to a rugged mount 205. Where used, mount 205 can also hold an associated Ethernet-based hit detection system 208, or hit detection system 208 can be mounted separately. A combined projector/hit-detection mount system can be attached to an industrial quality tripod for easy adjustment and alignment. Display system 200 can preferably be configured as forward or reverse projection to accommodate any deployment situation. If room in the facility permits, placing the projectors and hit detection systems behind the projection screen enables trainees to freely move about in front of the screen without the physical limitation of the projectors, cables, and the like.

The hit detection system allows trainee PC 230 or other computing device to determine when a shot is fired from weapon 100. Upon actuation of a firing mechanism, such as trigger 110, associated with the weapon, a laser "fires" one pulse per shot which, through hit detection system 208, indicates to the software where the shot enters the virtual environment space. Laser signatures specific to each weapon can identify individual shots fired from multiple weapons in the same lane, enabling multi-trainee training in a single lane as illustrated in FIG. 10.

Referring again to FIGS. 12-14, mission training typically consists of a Mission Briefing, Mission Execution, and an After Action Review. The training location floor plan illustrated in FIGS. 12-14 facilitates such training. The training location is preferably laid out in three separate stations, one for each respective training stage, to maximize trainee throughput. The illustrated embodiment consists of one Instructor station 320, one Observer station 330, and one or more trainee stations, or training lanes 300, per stage. Although the illustrated embodiment is presently preferred, it should be apparent to one skilled in the art that alternative numbers of stations and station arrangements can be substituted therefor without departing from the spirit or the scope of the invention. By way of example, alternative trainee stations may be substituted for trainee stations 300, such as 120 degree lane 310 which consists of a plurality of screens which are synchronized in time, image, shot detection, and the like.

In addition to the three stations, four separate software applications are preferably implemented across the various system components. Although the four software applications are described herein as separate entities, it should be apparent to one skilled in the art that the functionality of one or more applications can be combined together, and one or more application may be divided into a plurality of applications, without departing from the spirit or the scope of the invention. The following are summaries of each application. More detailed descriptions of each appear below.

The first application is the trainee application which is used to present a real-time image to the trainee in the lane via display system 200. This application also handles the input for hit detection system 208, weapon 100 inputs (including inputs from controllers 115, 120, and 140, described below), and clip stand inputs (described below), and propagates these inputs to a simulation server. In one embodiment, the inputs are propagated to the simulation server via the trainee station. In this embodiment, the trainee station preferably processes all input to the simulation from any trainee control device. As described below, by using these control devices, the trainee has the ability to fully interact with the 3D environment, shooting weapons, throwing grenades, climbing up on chairs, climbing ladders, climbing ropes, and the like. In one embodiment, the instructor station controls the observer station, which can run the trainee application in slave mode.

The second application is the instructor station. The instructor station preferably acts as the simulation server, network host, and simulation control station for mission execution.

The third application is the Scenario Editor. This application enables course designers to customize the tactical situation using a simple point and click interface and a standard scripting language.

The final application is the Level Editor. This application is used to build the environment, consisting of visible and invisible geometry, collision geometry, lighting information, special rendering pipeline information, and other characteristics of the environment, objects, and actors in the simulation.

The trainee station preferably includes at least one physical or virtual weapon. Referring to FIG. 10, although weapon 100 is illustrated as a machine gun, it should be apparent to one skilled in the art that alternative weapons, including other projectile weapons and non-lethal weapons such as stun-guns and tasers, may be substituted therefor without departing from the spirit or the scope of the invention. As illustrated in FIGS. 1-9, each weapon is preferably outfitted with one or more human interface controllers 115 and 120, as well as laser controller 150 and laser 155. Such a weapon may be the trainees' actual assigned weapon to which human interface controllers 115 and 120, and laser controller 150 and laser 155 are attached, or active, simulated weapons to which such components have been attached or into which they are embedded. Whether the weapon is the actual weapon or a simulated weapon, it is preferably not physically tethered to any system component, but rather makes use of a weapon-mounted, embedded signature laser 155 to identify shots to the system as described above.

A preferred embodiment of the invention allows controllers 115, 120 to be located where convenient and comfortable for the trainee. The trainee can adjust control positions based on arm length, hand size, and the like using a plurality of set screws 117 and brackets 116, and/or simply removing and rotating both the joystick/thumbstick and button mechanisms for a left handed configuration. Although the illustrated embodiment utilizes screws 117 to mount the controllers to the weapon, it should be apparent to one skilled in the art that alternative mounting means, including, without limitation, double-stick tape or other adhesive, and rubber bands or other mechanical devices, may be substituted therefor without departing from the spirit or the scope of the invention.

In a preferred embodiment, controllers 115 and 120 are implemented as traditional joysticks or thumbsticks, with the added functionality that pressing directly down on the joystick acts as an additional input. While a joystick is presently preferred, it should be apparent to one skilled in the art that alternative controller arrangements, including, without limitation, a plurality of buttons, or a trackball, may be substituted therefor without departing from the spirit or the scope of the invention.

A plurality of controllers are presently preferred because they allow the trainee to simultaneously navigate the simulated environment and adjust the view angle. By way of example, without intending to limit the present invention, controller 115 may be configured as a view angle controller. In such a configuration, activation of controller 115 can cause the display to change as though the trainee were turning or tilting his or her head. By contrast, when controller 120 is configured as a movement or navigation controller, activation of controller 120 can cause the trainee's position within the simulation to change as appropriate. The combination of these controls allows, for example, a trainee to look to his or her left while stepping backward.

Controllers 115 and 120 are preferably located at or near where the trainee traditionally holds the weapon. In the embodiment illustrated in FIGS. 1-9, controller 120 is located near trigger 110, while controller 115 is located along barrel 125. In the illustrated embodiment, cables 130 communicatively couple the controllers to wireless controller 105. However, it should be apparent to one skilled in the art that alternative communicative coupling means, including, without limitation, short-range ultrasonic or radio frequency communications, may be substituted therefor without departing from the spirit or the scope of the invention.

This methodology provides highly realistic simulated weapons engagement training. The conversion of a trainee's weapon into an indoor training weapon is a simple procedure that replaces the receiver or barrel with a simulation barrel or standard blank firing adapter, and adds laser 155 for indicating shot location. The weapon is then loaded with special indoor blanks or standard blanks as appropriate. In situations where users do not desire to use blanks, active simulated weapons that meet the same form/fit/weight/function as the real weapons may be substituted therefore without departing from the spirit or the scope of the invention.

In addition to the weapon being instrumented for simulation input with controllers 115 and 120, standard button presses may also be used to control trainee simulation control functions such as throwing a grenade, jumping, unjamming a weapon, switching weapons, or the like. The layout and placement of these buttons are configurable for each trainee to account for ergonomic variation and personal preference, as illustrated by input system 140 of FIGS. 8 and 9. Such buttons are preferably mounted to weapon 100, but may alternatively be provided by a traditional keyboard, or through an alternative input means, such as a plurality or buttons attached to or worn by a trainee.

By utilizing a multi-state input system such as input system 140, individual commands can be defined in terms of the activation of multiple controls, either simultaneously and/or in a defined temporally based sequence. This allows a far greater set of commands to be readily available to each trainee. By way of example, without intending to limit the present invention, one chord of buttons from input system 140 may temporally place the input state machine into an external control mode where the next command will affect the entire group to which the trainee is associated.

Figure 15:
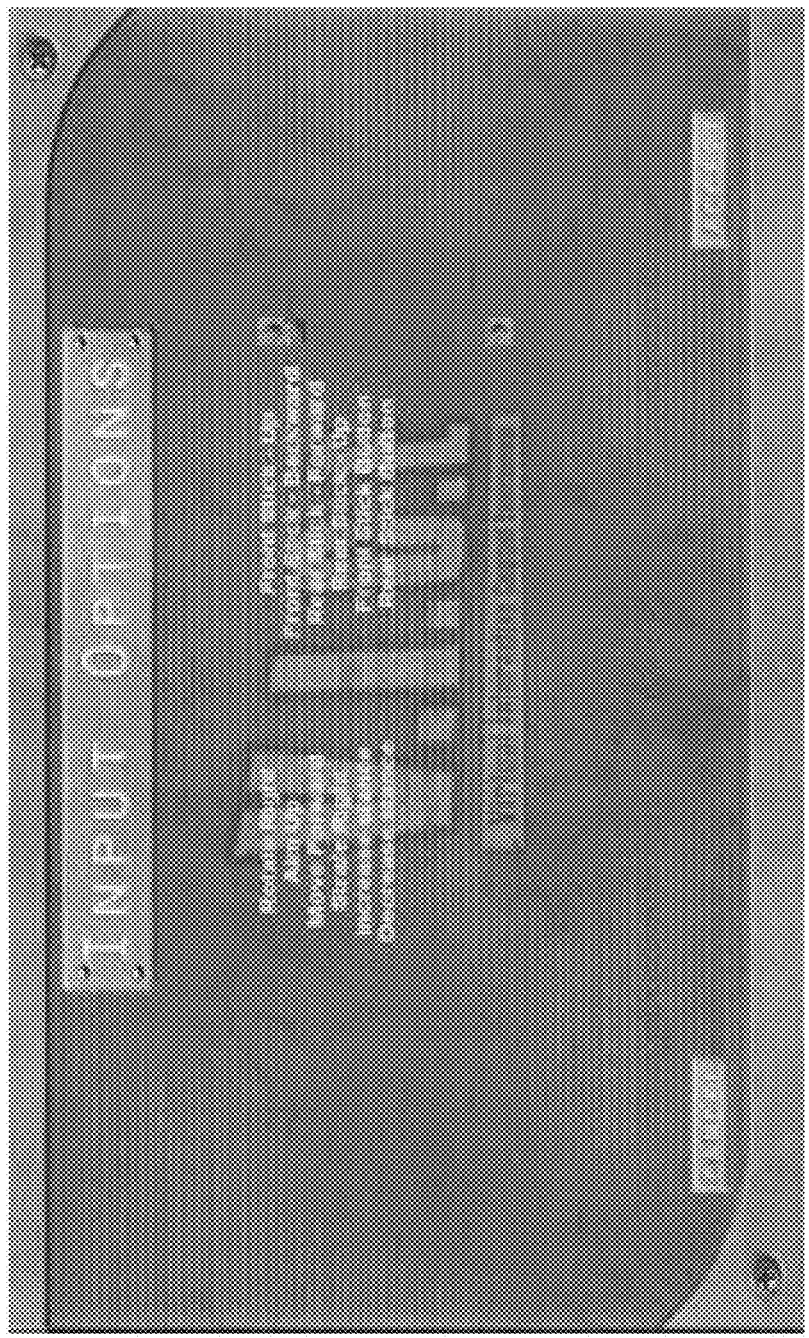
FIG. 15 is a screen capture of a user interface through which controller inputs can be customized to each trainee's preferences.

In one embodiment, trainees can customize the functionality represented by the various buttons on input system 140 and the functionality associated with each of controllers 115 and 120 through a weapon controls configuration screen such as that illustrated in FIG. 15. Such a screen allows the trainee to configure the movement and view axis controls, as well as setting the "hardness" of the configuration, based on directed inputs received from the instrumented weapon.

Figure 17:
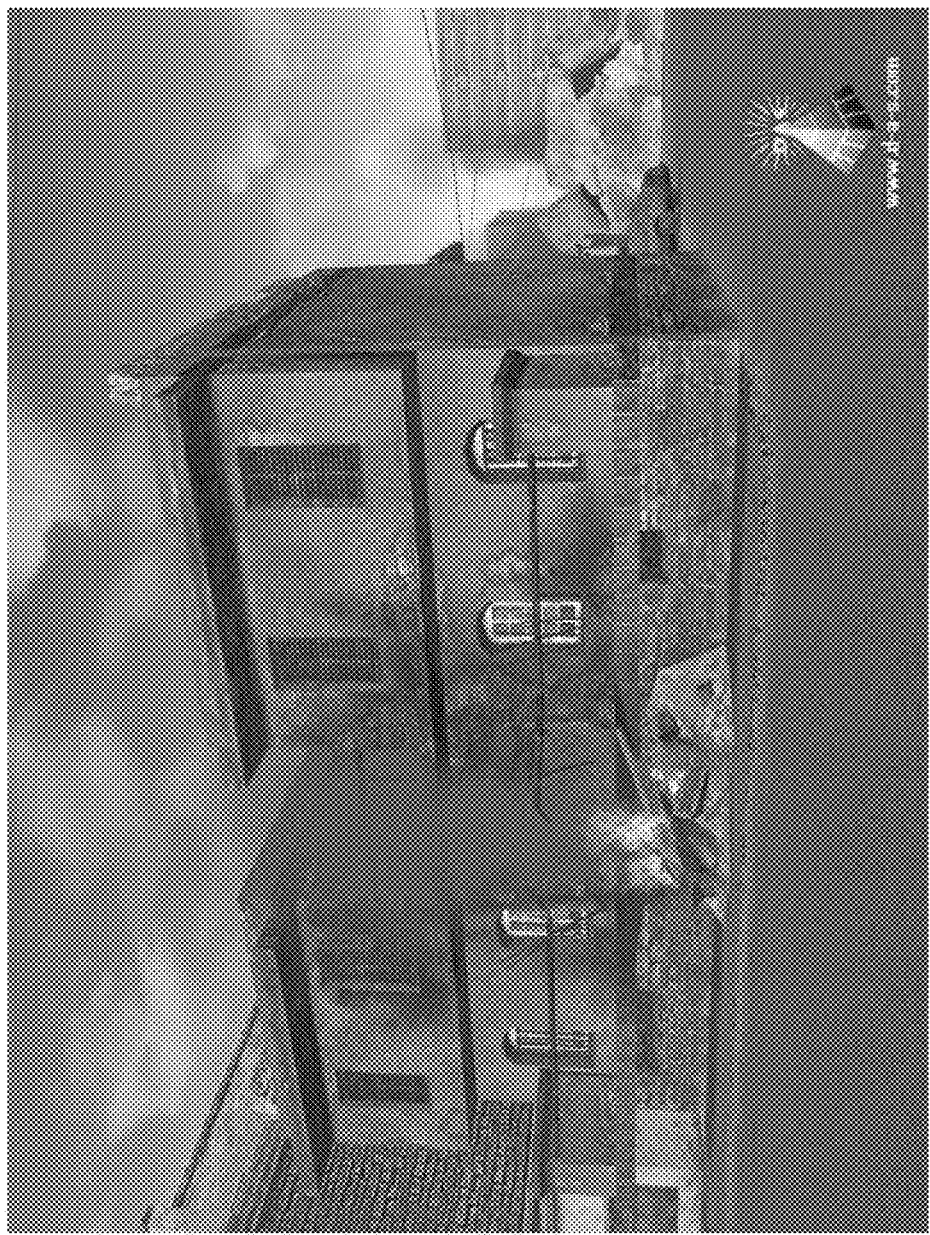
FIGS. 17 and 18 are screen captures of a simulated infantry training scenario.
Figure 18:

An object of the present invention is to provide an immersive, simulated environment in which a trainee can become more familiar with a weapon, practice various techniques and tactics, and the like. The immersive environment is a collaborative virtual world that preferably supports a variety of exterior terrain types such as urban, rural, and urban/rural transitions, as well as various building interior and exterior types, and specific custom-built interiors. The user's view of this environment can be static or moving. A moving viewpoint simulates walking, running, driving, or other movement within the environment, and can be controlled directly by the user, scripted in the scenario, or controlled by a secondary user. While walking or running through the environment, interior of buildings can be explored by moving through doorways from room-to-room, around corners, climbing up and down stairs, ropes, ladders, or the like. FIGS. 17 and 18 illustrate an exemplary Baghdad urban virtual environment with damaged buildings.

Whether the viewpoint is static or moving, the software can place scenario-driven artificial intelligence (AI) entities 1800 throughout the immersive environment to provide situational engagement opportunities. The AI can represent an individual entity or a group of entities, and can exhibit innocent/non-combatant, armed/opposition, or other such behaviors. These behaviors are preferably programmable and can be grouped and/or event-driven to compose complex behavior sequences. This technology differs from branching video scenarios by offering a wider variety of situations to be trained. Additionally, this technology provides the capability to add variability to AI behavior responses so the trainee learns to handle the situation, not the training device.

A goal of the present invention is to allow trainees to train under a variety of conditions, and to allow instructors to modify a given training scenario so that trainees learn to respond to events occurring in the simulation, rather than merely anticipating an event based on a prior simulation. To that end, a preferred embodiment of the present invention includes a Scenario Editor and a Level Editor. The Scenario Editor allows an instructor, curriculum developer, or other user to create new scenarios and to modify existing scenarios. It preferably provides the user with at least two different viewing modes, free fly camera mode and a locked camera view, effectively providing a 2D orthographic view. The Level Editor allows a curriculum developer to create new environments.

The Level Editor user can import new terrains or geometry from a variety of external software, such as, without limitation, those capable of generating OpenFlight™ files. Additionally, geometry created in 3DStudioMax or other three dimensional CAD or drawing tools can be imported as well. Such importation may occur through, for example, the use of Apex™ Exporter or other such tool. Using the mouse and keyboard, or the navigation area, the user can move, fly, or otherwise navigate around the imported terrain and place objects in the scenario. Objects can be placed by explicitly specifying a location (e.g., by mouse click), by using a paint function to rapidly populate objects (such as a forest or shrubs, trash or other urban clutter), or by using a random placement function with a user specified object density. Depending on the methodology used for rendering the terrain, the user may also specify the terrain textures, tiling factors, and detail texture to be used. The terrain may also have visual details, such as water, roads, scorch marks, and other types of visual detail placed on it. Objects added to the environment using the Level Editor can be moved, rotated, scaled, and have their object-specific attributes edited. The Level Editor is also used to generate or specify terrain and object collision meshes.

The Scenario Editor preferably includes an AI menu which enables the user to populate the environment with entities and specify their default behaviors. Opposing force entities can be given a mission or objective, a skill level, stealth level, and a set of human characteristics similar to those given to live participants. Non-combatant entities can be either given, for example, a starting point, number, path, and destination (i.e., an area in which they maneuver), or a place where they remain but perform a specified action. Other functions include a trigger/event system for specifying complex scenario behaviors.

The Scenario Editor preferably also contains other menu items which allow the user to specify attributes of special objects such as weapons (e.g., weapon type, useful range, slope, lethality, damage/interaction with objects), and explosive devices (e.g., fireball size, lethal range, injury range and damage/interaction with objects). The Scenario Editor also supports the ability to assign "health" to objects in the environment. Anything interacting with a particular object has the capability of doing damage (reducing the "health") to the object, by virtue of its speed, hardness, and other factors.

The destructible object system is closely tied to the material system. If the user specifies that a submesh of an object is "wood", the properties of wood will be applied to that submesh. The "wood" material's basic properties would include particle effect, collision interaction sounds, bullet and scorch marks, but also more advanced physical properties such as brittleness—which is where the destructible object system comes into play.

The brittleness of a material, such as wood or glass, determines the amount of impulse or force required to break the object to which the material is assigned. Break points and fracture paths are determined on-the-fly based on the position and direction of the applied contact force. By way of clarification, without intending to limit the present invention, in two dimensions, a fracture path can be thought of as a series of connected line segments with randomly perturbed orientations. The implementation of brittleness simulation preferably involves splitting the volume that comprised the original object, and applying a pre-assigned texture to the newly created polygons. This texture represents the object's newly exposed interior.

Entity visual representations within the simulation are preferably comprised of various body-type representations (man, woman, child, etc.) combined with customizable appearances enabling different face, skin, hair, and clothing styles to be employed. With this multi-variable approach to entity implementations, the software provides a virtually limitless set of human representations. FIG. 18 illustrates four different entities firing on the trainee.

Entities are engaged during a simulation using physical or virtual weapons. When a shot is registered in the simulated environment, the appropriate response is elicited through the infliction of damage on the scene or other entities. Visual special effects as well as physical reactions provide visual indications of damage. Some of the visual special effects include explosions, blood splatter, dust bursts, debris bursts, sparks, wood chips (from trees), cement bursts, bullet holes, and scorch marks. Physical indications include body movement reactions, large flying debris, and vehicle physical impacts. Additionally, shots registered in the environment can also elicit responsive behavior from the entities in the scene per their programmed behavior patterns in the given scenario.

The present invention preferably uses a base morale score with different factors to compute a morale score for each entity or group of entities in the simulation. The morale score will affect the behavior of friendly and enemy AI entities. The score can also be used to determine if the entity should be suppressed. The following are exemplary factors contributing to the morale score. The following list is intended to be exemplary and not a comprehensive list of the only factors which contribute to the morale score.

Enemy Shot At +1
Enemy Hit +3
Enemy Killed +5
Friendly Shot At −1
Friendly Hit −3
Friendly Killed −5

When morale is lower, AI entities may prefer cover, line-of-sight to friendlies, closer to friendlies, reduce cutoff cost, reduce accuracy, use a lower profile (like crouch attack), if running away then panic and do not fire back and try to increase distance to threat. Based on morale score and the amount bullets "shot at" an AI entity or group of entities, the simulation can determine if the entity becomes suppressed (i.e. exhibits longer cover intervals), pinned (suppressed+ does not move), cowered (pinned+does not fire back), or the like.

To detect shot proximity, a sphere is created around each entity and a raycast is calculated which passes from the bullet's entry, exit, and mid point (middle of the line connecting the entry and exit points on the sphere) to the entity. If the ray passes through the sphere, then it means the bullet passed close by and the entity was capable of perceiving it, which in turn alters the entity's morale score as described above.

Although scenarios can be designed for stand-alone training, training is preferably controlled via an instructor station. During a simulation, the instructor is presented with a user interface similar to those illustrated in FIGS. 19-22 The instructor station provides master scenario selection and overall simulation execution control. Scenario execution control commands can include, but are not limited to, start, stop, pause, and resume. The instructor is preferably presented with his own free-fly camera view of the environment, allowing him to view the scenario from any desired perspective.

Figure 16:
FIG. 16 is a screen capture of an entity list for use by an instructor station.
Figure 19:
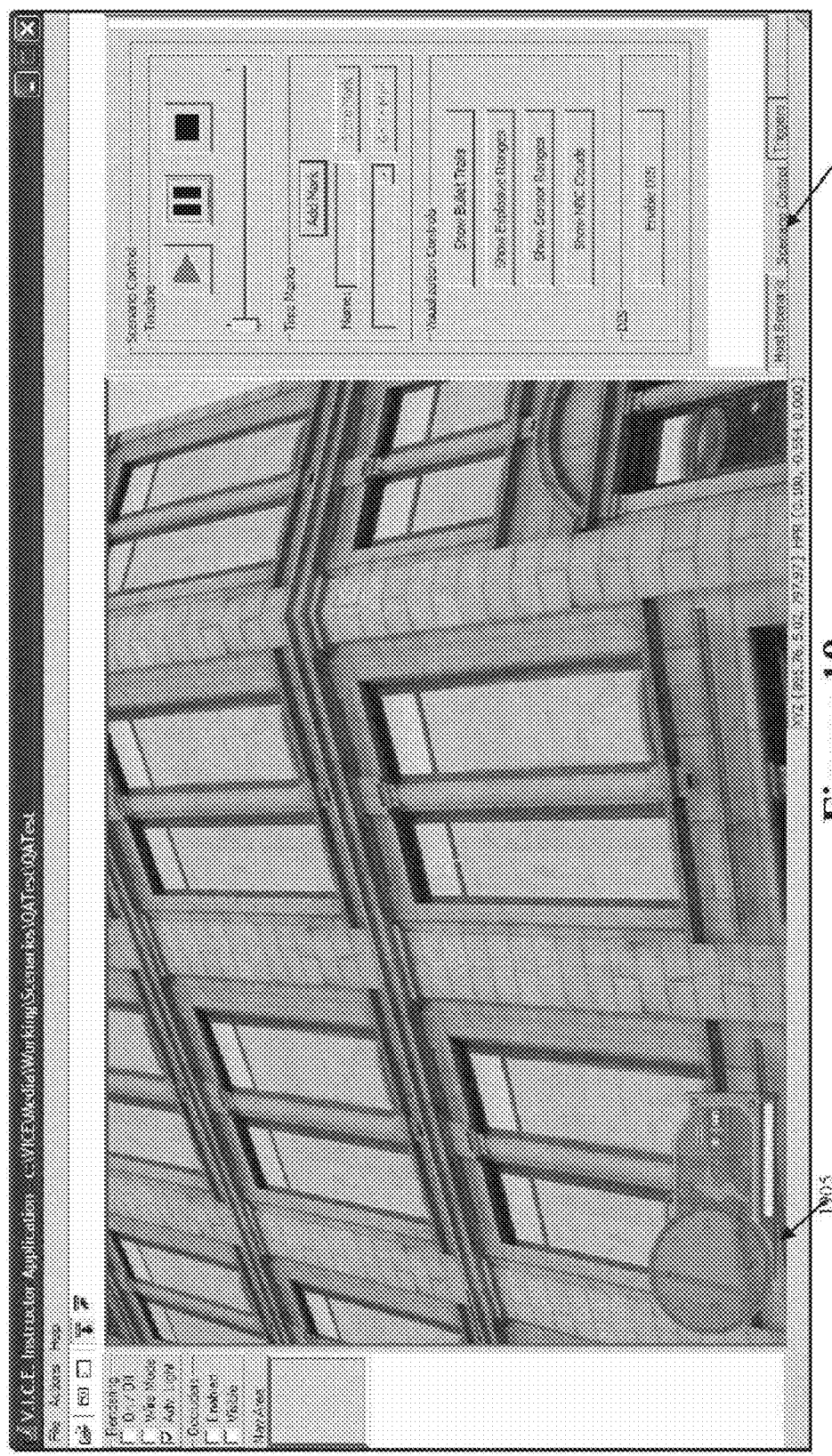
FIG. 19 is a screen capture of an instructor station display illustrating exemplary scenario control interfaces.
Figure 20:
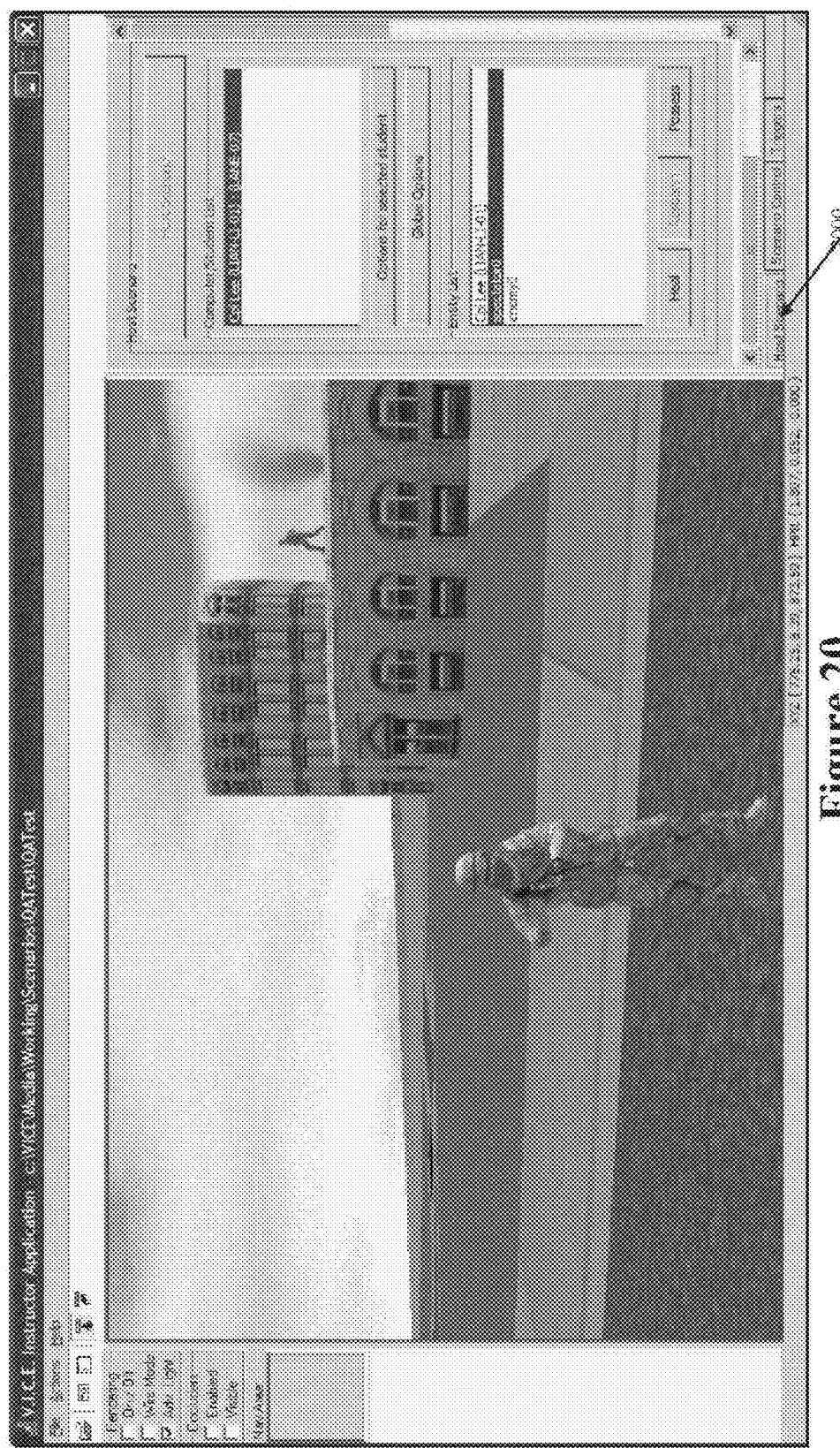
FIG. 20 is a screen capture of an instructor station display illustrating exemplary host scenario control interfaces.
Figure 22:
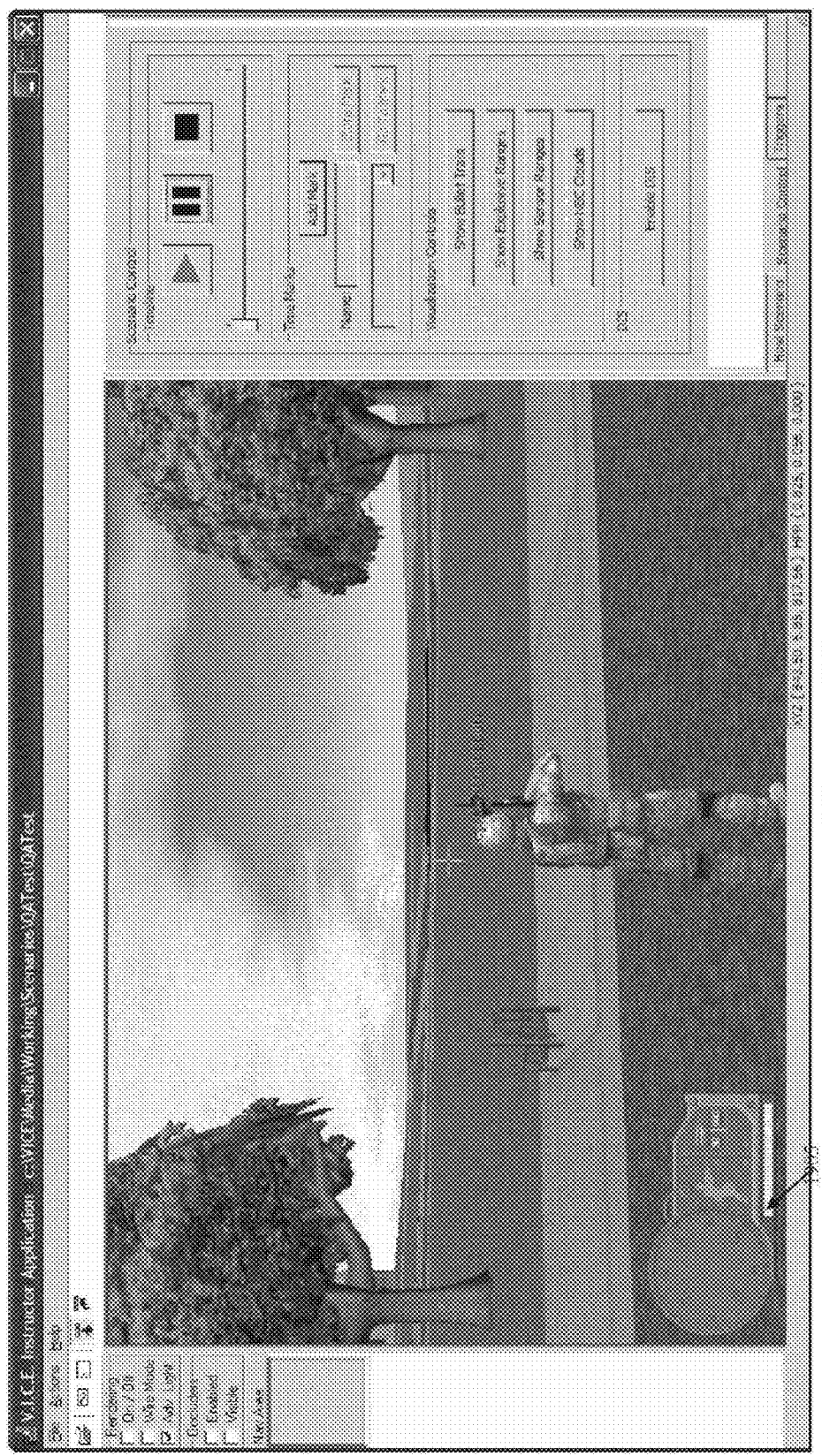
FIG. 22 is an alternative screen capture of an instructor station display illustrating exemplary scenario control interfaces, and further illustrating exemplary trainee monitoring interfaces.
Figure 23:
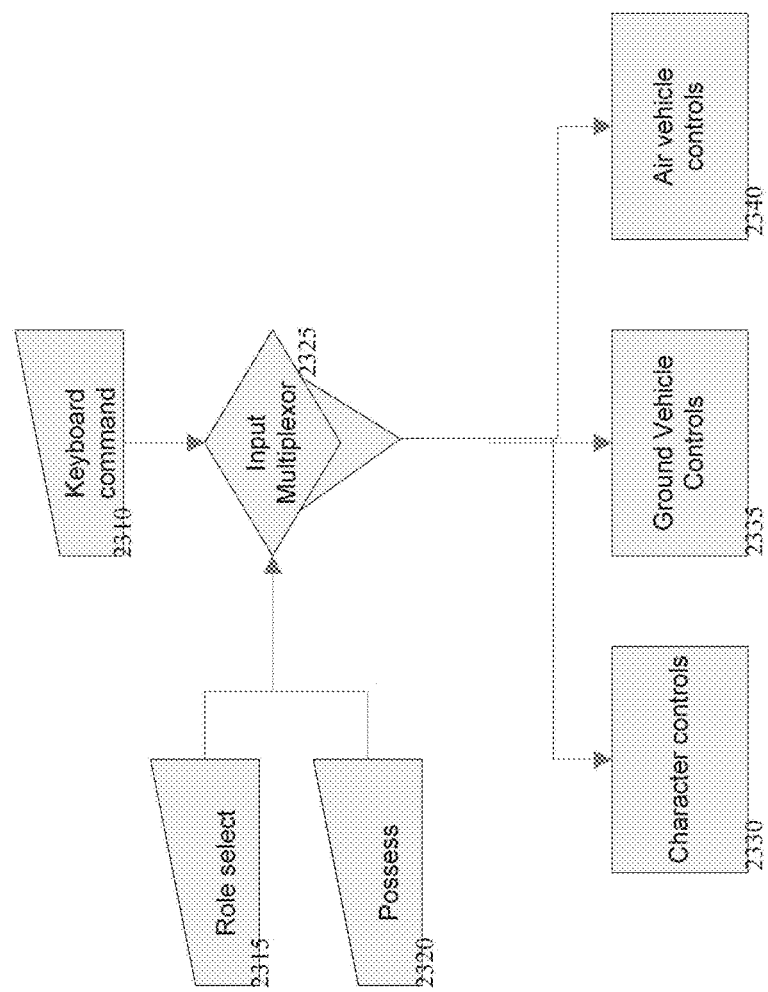
FIG. 23 is a flow diagram illustrating an exemplary instructor-controlled agent possession process.

The instructor can also select a role to play in the first person to enhance the reality of the training. Using an object oriented actor management and command system, exemplary interfaces to which are illustrated in FIGS. 16 and 22, the distributed training application can use a multiplexed command router to send input from the instructor station to an appropriately selected distributed actor when the 3D environment widget has focus in the application. Such distributed actors may include an AI entity or a trainee, and can be "possessed" (i.e. controlled), healed, and/or respawned (i.e. reinstantiated or resuscitated) by the instructor, as illustrated in FIGS. 16 and 19. FIG. 23 illustrates a method through which an instructor can possess an entity.

In FIG. 23, the instructor can select the entity to be possessed (block 2315), and clicks the possess button (block 2320). Any keyboard commands or other inputs (block 2310) are then multiplexed to an appropriate entity control (block 2330), ground vehicle control (block 2335) or air vehicle control (block 2340).

FIG. 19 further illustrates a host scenario interface, through which the instructor can instantly move to the location of a given entity, and through which the instructor can select various trainee and/or simulation options. FIG. 22 illustrates an instructor's third-person view of a trainee after clicking on the trainee's name in the trainee list of FIG. 19.

Figure 21:
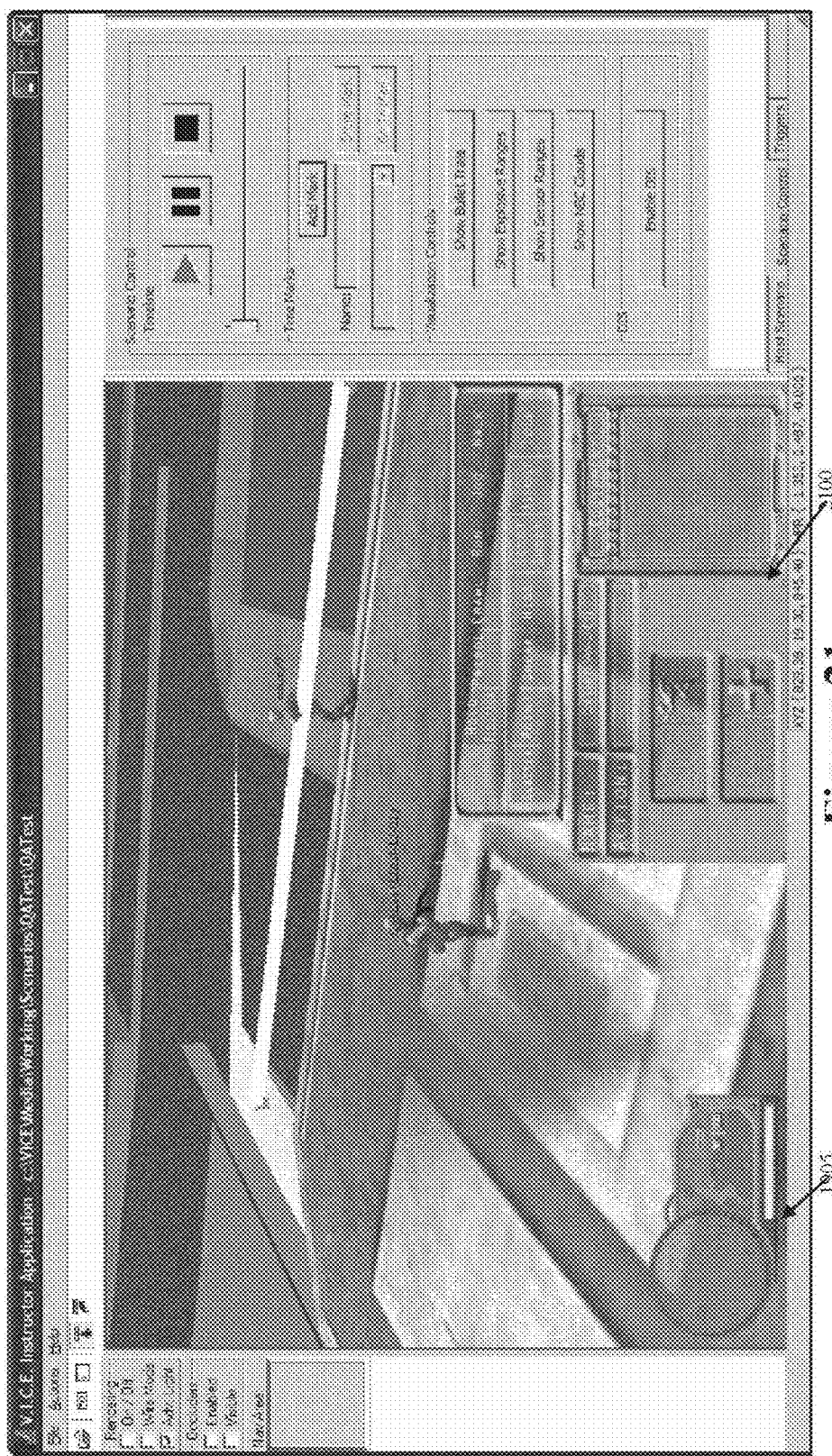
FIG. 21 is an alternative screen capture of an instructor station display illustrating exemplary scenario control interfaces, and further illustrating exemplary agent control interfaces.

As illustrated in FIG. 21, when the instructor possesses or controls an entity, the instructor's view frustum and HUD 1905 are switched to be consistent with a first person perspective simulation. Additional controls may also be presented to the instructor, including compass, friendly AI locater, objective locater, health and stance indicator. The instructor can also control an entity from a third person perspective and command the entity to behave in a certain manner via entity control 2100. Similarly, when the instructor is controlling an entity who is performing a task more traditionally simulated from a third person perspective, such as, without limitation, operating a vehicle, the instructor's view frustum can be similarly converted. Once the necessity of instructor participation at this level is complete, the instructor may return control of the entity to the originally controlling AI or training participant.

During the scenario, an after action review (AAR) log is compiled at the instructor station. The AAR information preferably includes, but is not limited to, the number of shots fired by each trainee, where those shots landed, the firing line of site, reaction time, and other pertinent data deemed important by the instructors. With the AAR log, the instructor can play back the scenario on his local display and/or the trainees' display system to debrief performance. The playback system preferably employs a "play from here" methodology from any given time-point in the AAR log file.

In one embodiment, an instructor can use a simple user interface, such as scenario control 1900 of FIG. 19, to indicate what communication channels are available, thereby giving the instructor complete control over the communication matrix. The instructor can create, enable, or disable individual channels, team channels, or global broadcast channels. The instructor can specify which channels to record for AAR and flag the AAR with bookmarks. The instructor can also record selected individuals, groups, or sub-groups. External communications will also be recorded, such as those sent for a simulated call for fire, and the like.

Although an instructor can insert bookmarks via the add mark button of scenario control interface 1900 or other such user interface element, certain events should trigger a bookmark automatically. These events include, but are not limited to, an enemy entering the trainee's field of view for the first time, trainee death, enemy death, all explosions, trigger activation, and from scripts. Specific evaluation triggers will automatically log the event in the trainee's individual AAR statistics.

Multi-channel Hit Detection is accomplished by the sending of a network packet whenever a mouse click input is received on a slave channel. The network packet contains the position and direction of the projected ray created out of the two dimensional mouse click. That network packet is processed by the master channel, and a hit is registered using the ray information. To avoid having multiple hits registered in the cases where the screen area overlaps between the channels, a comparison is done on the time of each hit against the maximum fire rate of a weapon. If a hit happens too quickly, the hit is discarded.

Figure 24:
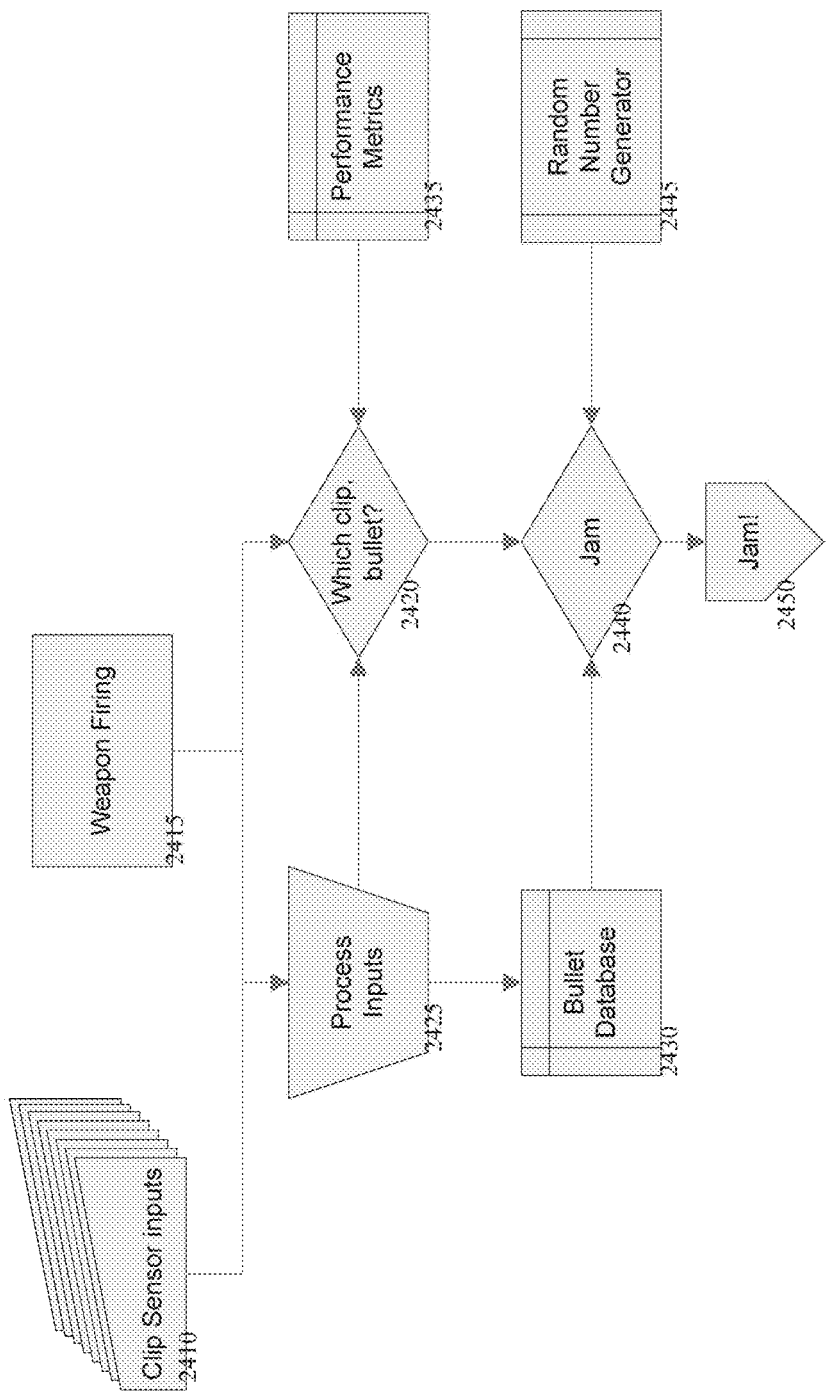
FIG. 24 is a flow diagram illustrating an exemplary weapon jam simulation process.

One embodiment of the present invention can simulate a weapon system jamming based on the current clip 135, cumulative effects of the rounds fired, and the like, as illustrated in FIG. 24. In one embodiment, weapon 100 is equipped with a clip sensor that determines which clip 135 is currently in the weapon. In an alternative embodiment, clips 135 are stored in a container or placed on a stand, and the table or container is capable of inventorying the clips contained therein. As each clip is removed, a record is made of the clip currently in use. Based on the clip sensor inputs 2410, the clip and projectile are determined (block 2420) each time the weapon is fired (block 2415). This information is processed (block 2425) and stored in a database (block 2430) so the trainee cannot "reuse" a previously expended clip. Performance metrics, such as, without limitation, the jam frequency, particulate build-up, or the like, associated with each projectile are also accessed, and these performance metrics are used to determine the likelihood of a jam. A random number generator 2445 can be used to determine whether, based on the likelihood of a jam, a jam actually occurs.

By tracking clips, rounds within the clips, and the types of those rounds (standard, tracer, custom, other) in a database, using RFID or other wireless or wired technology which includes a special clip stand that is instrumented to identify which clips 135 remain unused (and may thereby derive which clips have been used), the simulation can statistically derive the probabilities used to simulate a realistic and reasonable weapon jam during the currently executing firing cycle. The probability of jamming during any firing cycle is related to the round type being fired, the total rounds fired in this session, the total rounds fired since the last jam, the number of rounds fired of each ammunition type this session, the number of rounds fired of each ammunition type since the last jam, and other items which are tracked in the simulation; or a jam may be simulated at the command of the instructor, or as a predefined command in a control script.

Figure 25:
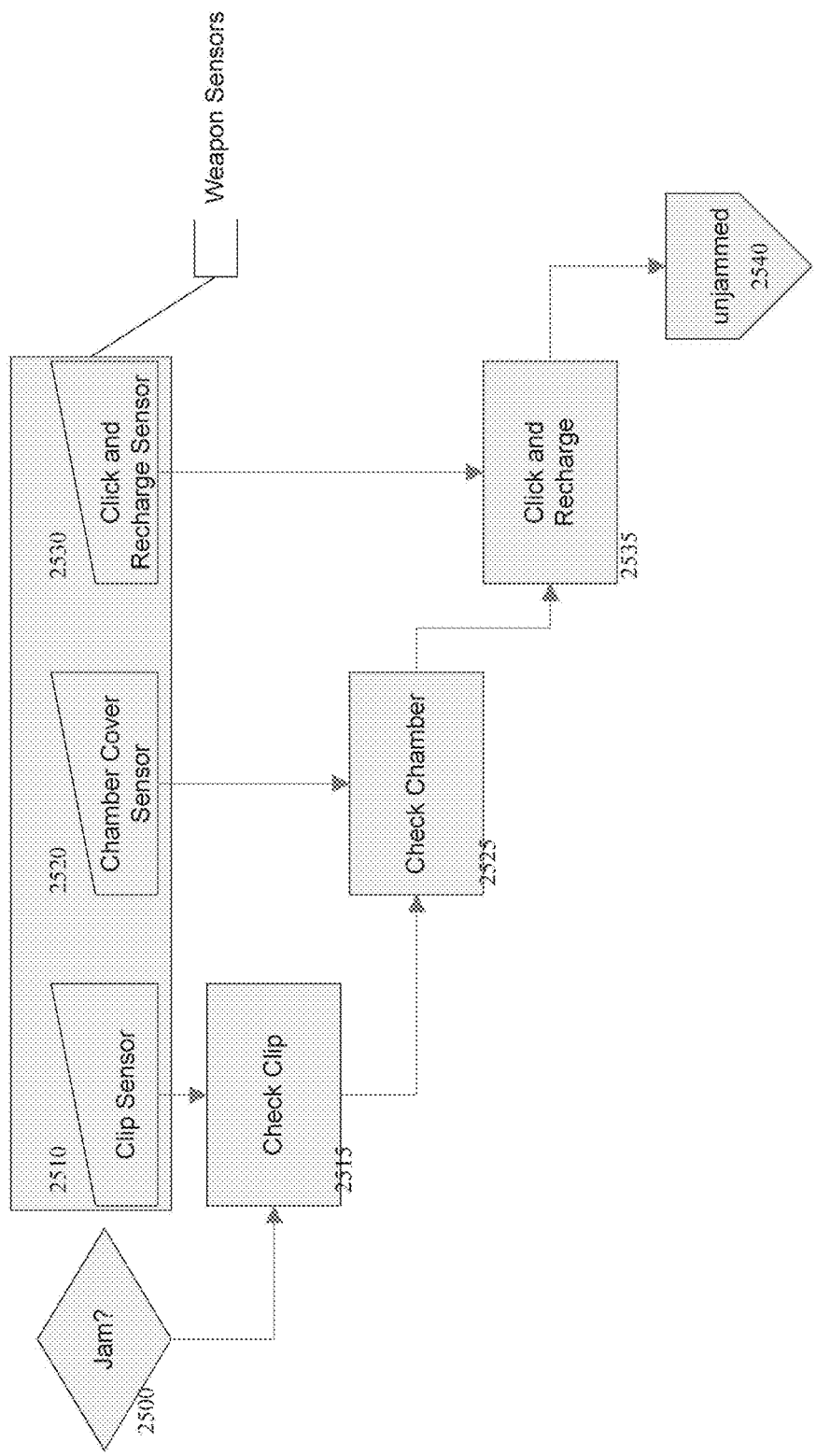
FIG. 25 is a flow diagram illustrating an exemplary weapon jam clearing process.

Once a weapon jam has occurred, the firing signal to the instrumented weapon is blocked and the trainee must perform a jam clearing procedure to reactivate the weapon. This procedure may range in complexity from the press of a single button on the instrumented weapon, to a complex series of steps which are sensed by the simulation from a fully instrumented weapon, such as that illustrated in FIG. 25. In the exemplary procedure illustrated in FIG. 25, when a jam occurs (block 2500), a clip sensor 2510 is polled to determine whether the trainee has removed the clip and examined it (block 2515). The time the clip has been removed from the weapon can be monitored to force the trainee to make the simulation more realistic. Depending on the type of jam, the clip check may be sufficient to unjam the weapon, and the simulation continues as normal. If the weapon is still jammed, the chamber cover can be monitored via a chamber cover sensor (block 2520) to determine whether the trainee has checked the chamber (block 2525). As with the clip sensor, depending on the type of jam, the chamber check may be sufficient to unjam the weapon, and the simulation continues as normal. If the weapon is still jammed, the system can monitor the click and recharge sensor 2530. If the trainee has performed the appropriate steps, the weapon will unjam. Although described above in terms of physical checks, such steps may include, virtually checking the chamber, engaging a new round into the chamber with the bolt, charging the gun with the charging arm, or the like. Once the proper procedure has been performed, as monitored by the simulation using a state machine, the system re-engages the firing signal, thereby allowing the weapon to activate normally.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

We claim as our invention:

1. An instructor controlled training simulation system to train teams, comprising:
    a computer generated simulated training environment comprising a collaborative immersive virtual environment wherein simulated movements and interactions of each of one or more team members are represented within the simulated training environment;

at least one trainee station, comprising:
   a firing area to host a team member, the firing area comprising a first end, a second end, and at least one display arranged substantially near the second end to display the simulated training environment,
   at least one weapon, the weapon being substantially similar to an infantry weapon, and
   at least one controller, the at least one controller mounted on the at least one weapon, to simulate movement within and interact with the simulated training environment;
at least one computer to generate the simulated training environment, the at least one computer communicatively coupled to the at least one display and communicatively coupled to the at least one controller, the at least one computer monitoring inputs from the at least one controller and modifying the simulated training environment displayed on the display based on the inputs;
a plurality of communication channels to allow communication among the instructor and the one or more team members;
an instructor station to host the instructor, to serve as a simulated training environment server and network host for the at least one computer and the at least one trainee station, and to serve as a simulated training environment control station, the instructor station receiving and propagating inputs from the at least one trainee station and allowing the instructor to control, modify, and record the execution of the simulated training environment, to control and record the communication channels, to create custom simulation scenarios for the simulated training environment, and;
a scenario editor to edit the collaborative immersive training environment during the training simulation, wherein the scenario editor allows the instructor to take over an entity represented within the collaborative immersive training environment during the training simulation, and
wherein the at least one display in each trainee station displays a viewpoint of the collaborative immersive virtual environment corresponding to movements and interactions of the at least one controller.

2. The system of claim 1, the at least one controller comprising a plurality of controllers, at least one of the plurality of controllers positioned substantially near a trigger of the weapon.

3. The system of claim 1, the at least one controller comprising a plurality of controllers, at least one of the plurality of controllers positioned along the barrel of the weapon.

4. The system of claim 1, the at least one computer communicatively coupled to the at least one controller via a wireless communication link.

5. The system of claim 1, wherein the instructor station monitors and records actions of the team members within the simulated training environment and wherein the instructor station records and/or disables particular communication channels.

6. The system of claim 5, further comprising an observer station to view the training simulation.

7. The system of claim 1, wherein the entity taken over represents at least one computer controlled entity within the simulated training environment.

8. The system of claim 1, wherein the entity taken over represents at least one of the one or more team members within the simulated training environment.

9. The system of claim 1, wherein the communications channels allows at least one of the instructor and the one or more team members in a first firing area to communicate with one or more team members in a second firing area to coordinate simultaneous simulated movement within the simulated training environment.

10. The system of claim 9, wherein the communication channels carry voice commands between the instructor and the one or more team members.

11. The system of claim 1, the weapon configured to fire at least one simulated projectile, the at least one simulated projectile stored in at least one clip.

12. The system of claim 11, wherein each of the at least one clips comprises an identifier, the system determining the type of simulated projectile stored in the clip currently in the weapon based on the identifier and a number of projectiles fired such that the weapon cannot reuse a previously expended clip.

13. The system of claim 12, the system determining the type of projectile stored in the clip currently in the weapon by inventorying the clips associated with the team member and identifying the clip missing from the inventory.

14. The system of claim 13, the system determining whether a clip has been used based on the identifier.

15. The system of claim 1, the system simulating a weapon jam according to at least one of the types of projectiles fired and the number of projectiles fired.

16. The system of claim 15, the system monitoring interactions with the weapon to determine when prescribed steps for clearing the simulated weapon jam are performed.

17. The System of claim 1, wherein the instructor controlled training simulation system comprises two or more trainee stations, and wherein the computer represents the movements and interactions of the at least one controller in every trainee station in the same collaborative immersive virtual environment, and the at least one display in each trainee station also displays a representation of the movements and interactions of the at least one controller in the other trainee stations.

18. A training simulation system, comprising:
   a trainee station, comprising:
      a plurality of firing areas to host at least one trainee, each firing area having associated therewith at least one display, and
      at least one weapon mounted with detachable and adjustable controllers;
   at least one computer, the at least one computer communicatively coupled to the at least one display and the at least one weapon, the at least one computer generating a collaborative immersive training environment displayed by the at least one display wherein simulated movements and interactions of the at least one trainee are controlled by the controllers and represented within the collaborative immersive training environment as an entity, wherein the at least one display in each trainee station displays a viewpoint of the collaborative immersive training environment corresponding to movements and interactions of the controllers; and
   at least one instructor station to host an instructor, to serve as the training simulation server and network host for the at least one computer and the trainee station, and to serve as a training simulation control station, the at least one instructor station communicatively coupled to the at least one computer, the at least one instructor station receiving and propagating inputs from the at least one trainee station and allowing the instructor to control, modify, and record the execution of the training simulation and collaborative immersive training environment, to create custom simulation scenarios, and the instructor station further comprises a scenario editor to edit the collaborative immersive training environment during the training simulation, wherein the scenario editor allows the instructor to take control of the entity represented within the collaborative immersive virtual environment during the training simulation.

19. The system of claim 18, wherein the training simulation system comprises two or more trainee stations, and wherein the at least one computer represents the movements and interactions of the controllers in every trainee station in the same collaborative immersive training environment as two or more entities, and the at least one display in each trainee station also displays a representation of the movements and interactions of the controllers in the other trainee stations.

20. The system of claim 19, wherein one of the controllers is located substantially near the trigger of the weapon.

21. The system of claim 19, wherein one of the controllers is located along the barrel of the weapon.

22. The system of claim 18, further comprising:
a plurality of communication channels to allow communication among the instructor and the at least one trainee, the communications channels allowing at least one of the instructor and the at least one trainee in a first trainee station to communicate with one or more trainees in a second trainee station to coordinate simultaneous simulated movement of the trainees in the first and second trainee stations within the collaborative immersive training environment,
wherein the instructor station allows the instructor to record and/or disable particular communication channels, and wherein bookmarks are created during the recording of the training simulation, the creation of bookmarks automatically triggered by specific events in the collaborative immersive training environment or manually created through the instructor station.

23. A method of interacting with a collaborative immersive training environment generated by a training simulation system having at least one trainee station comprising a firing area to host a trainee, at least one controller, a plurality of communication channels, and at least one display corresponding to the firing area, comprising:
displaying a computer generated simulation on the at least one display, the simulation comprising the collaborative immersive training environment wherein simulated movements and interactions of the trainee is controlled by the at least one controller and is represented within the collaborative immersive training environment as an entity, wherein the at least one display displays a viewpoint of the collaborative immersive training environment corresponding to the simulated movements and interactions of the trainee in each trainee station;
equipping a physical weapon with the at least one controller;
communicating through the communication channels to coordinate simultaneous simulated movement of the trainees within the collaborative immersive training environment;
navigating the collaborative immersive training environment displayed on the display via the at least one controller;
monitoring the collaborative immersive training environment for at least one hostile target;
engaging the hostile target using the physical weapon; and
allowing an instructor to observe the collaborative immersive training environment via an instructor terminal of the training simulation system, the instructor terminal allowing the instructor to monitor and record actions of the team members within the collaborative immersive training environment, and to modify the conditions of the collaborative immersive training environment during the training simulation,
wherein the training simulation system comprises two or more trainee stations, and wherein the movements and interactions of the at least one controller in every trainee station is represented in the same collaborative immersive training environment, and the at least one display in each trainee station also displays a representation of the movements and interactions of the at least one controller in the other trainee stations, and
wherein the training simulation system further comprises a scenario editor to edit the collaborative immersive training environment during the training simulation, the scenario editor allowing the instructor to take over an entity represented within the collaborative immersive training environment during the training simulation.

24. The method of claim 23, further comprising editing the collaborative immersive training environment during the training simulation.

25. The method of claim 24, the weapon comprising a projectile weapon similar in size, weight, and feel to a traditional infantry weapon.

26. The method of claim 25, further comprising firing a projectile at the hostile target as part of the engaging step.

27. The method of claim 26, further comprising calculating the projectile path through the collaborative immersive training environment.

28. The method of claim 26, the weapon simulating the projectile firing.

29. The method of claim 26, further comprising monitoring at least one of the number and type of projectiles fired by the weapon and simulating a weapon jam according to at least one of the number and type of projectiles fired.

30. The method of claim 29, the weapon jam simulated at a frequency substantially similar to that associated with the use of the physical weapon in the real world.

31. The method of claim 29, further comprising simulating the depletion of projectiles from a clip associated with the weapon for each weapon firing such that the weapon cannot reuse a previously expended clip.

32. The method of claim 23, further comprising permitting the instructor to interact with the collaborative immersive training environment.

33. The method of claim 32, the interaction comprising altering environmental characteristics.

34. The method of claim 33, the environmental characteristics comprising wind, time of day, and lighting.

35. The method of claim 23, wherein the instructor takes control of at least one computer controlled entity within the collaborative immersive training environment.

36. The method of claim 23, wherein the instructor takes control of an entity representing at least one trainee within the collaborative immersive training environment.

37. A training simulation system, comprising:
a computer to generate a training simulation comprising a collaborative immersive training environment;
at least one trainee station, comprising:
a firing area to accommodate a trainee and at least one display to display the collaborative immersive training environment, and
at least one controller to interact with the collaborative immersive training environment, the at least one controller mounted on a physical weapon,
wherein the controller controls simulated movement and interaction of the trainee within the collaborative immersive training environment, and wherein the at least one display in each trainee station displays a viewpoint of the collaborative immersive training environment corresponding to movements and interactions of the at least one controller;

an instructor station to host an instructor, to serve as server and network host for the computer and the at least one trainee station, and to serve as a training simulation control station, the instructor station receiving and propagating inputs from the at least one trainee station and allowing the instructor to control, modify, and record an execution of the training simulation, to create custom simulation scenarios for the training simulation, and;

a scenario editor to edit the collaborative immersive training environment during the training simulation;

wherein the scenario editor allows the instructor to take over an entity represented within the collaborative immersive training environment during the training simulation.

38. The training simulation system of claim 37, further comprising:

a plurality of communication channels to allow communication among the instructor and the trainee, the communications channels allowing at least one of the instructor and the trainee in a first trainee station to communicate with one or more trainees in a second trainee station to coordinate simultaneous simulated movement of the trainees in the first and second trainee stations within the simulated collaborative immersive training environment, wherein the instructor station allows the instructor to record and/or disable particular communication channels.

39. The training simulation system of claim 37, wherein the trainee uses the at least one controller to engage targets within the training simulation and the controller generates an input according to a firing of the weapon.

40. The training simulation of claim 39, wherein the computer calculates a trajectory of a simulated projectile within the training simulation according to the input corresponding to the firing of the weapon.

41. The training simulation system of claim 39, wherein the training simulation system monitors at least one of a number of projectiles fired and a type of projectile fired by the weapon such that the weapon cannot reuse a previously expended clip and weapons jamming is simulated according to one of the number of projectiles fired and the type of projectile fired.

42. The training simulation system of claim 39, wherein the firing of the weapon comprises firing of blank rounds.

43. The training simulation system of claim 37, further comprising:

a level editor to create and edit the collaborative immersive training environment.

44. The training simulation system of claim 37, wherein the training simulation system comprises two or more trainee stations, and wherein the computer represents the movements and interactions of the at least one controller in every trainee station in the same collaborative immersive training environment, and the at least one display in each trainee station also displays a representation of the movements and interactions of the at least one controller in the other trainee stations.

45. The training simulation system of claim 37, wherein bookmarks are created during the recording of the training simulation, the creation of bookmarks automatically triggered by specific events in the collaborative immersive training environment or manually created through the instructor station.

46. The training simulation system of claim 37, wherein the physical weapon is a traditional infantry weapon or a physical weapon similar in size, weight, and feel to a traditional infantry weapon.

* * * * *